(12) United States Patent
Hashimoto

(10) Patent No.: US 8,970,493 B2
(45) Date of Patent: Mar. 3, 2015

(54) INFORMATION PROCESSING DEVICE FOR CHANGING CURSOR DISPLAY POSITION, COMPUTER READABLE NON-TRANSITORY RECORDING MEDIUM, AND INFORMATION PROCESSING METHOD

(75) Inventor: Hitoshi Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 13/611,861

(22) Filed: Sep. 12, 2012

(65) Prior Publication Data

US 2013/0002546 A1  Jan. 3, 2013

Related U.S. Application Data

(63) Continuation of application No. PCT/JP2010/054838, filed on Mar. 19, 2010.

(51) Int. Cl.
  *G06F 3/033* (2013.01)
  *G09G 5/08* (2006.01)
  *G06F 3/048* (2013.01)
  *G06F 3/0481* (2013.01)

(52) U.S. Cl.
  CPC ............ *G06F 3/04812* (2013.01); *G06F 3/033* (2013.01)
  USPC .......................................... 345/157; 715/858

(58) Field of Classification Search
  CPC .............. G06F 3/04812; G06F 3/0482; G06F 3/03543; G06F 3/038; G06F 3/048
  USPC .................................. 715/856, 858; 345/157
  See application file for complete search history.

(56) References Cited

U.S. PATENT DOCUMENTS

| | | | |
|---|---|---|---|
| 5,461,709 A * | 10/1995 | Brown | 715/848 |
| 6,323,884 B1 | 11/2001 | Bird et al. | |
| 6,836,566 B1 | 12/2004 | Hirayama | |
| 2010/0235391 A1 * | 9/2010 | Eklund, II | 707/780 |

FOREIGN PATENT DOCUMENTS

| | | | |
|---|---|---|---|
| JP | 62-3292 | 1/1987 | |
| JP | 63-298429 | * 12/1988 | ............. G06F 3/033 |
| JP | 6-295225 | 10/1994 | |
| JP | 09-114594 | * 2/1997 | ............. G06F 3/033 |
| JP | 9-114594 | 5/1997 | |
| JP | 2000-214980 | 8/2000 | |
| JP | 2000-305685 | 11/2000 | |

OTHER PUBLICATIONS

International Search Report of Corresponding PCT Application PCT/JP2010/054838 mailed Jul. 6, 2010.

(Continued)

*Primary Examiner* — Dwayne Bost
*Assistant Examiner* — Larry Sternbane
(74) *Attorney, Agent, or Firm* — Staas & Halsey LLP

(57) ABSTRACT

An information processing device includes: a display device; a pointing device; a cursor display unit that displays a cursor on a screen of the display device in accordance with operations of the pointing device; a first acquisition unit that acquires position information indicating a position, on the screen, of a function handle to which a function of processing a user interface object is assigned and which is displayed on the screen of the display device; and a position changing unit that changes a display position of the cursor such that the cursor on the screen is at the position indicated by the position information acquired by the first acquisition unit, in response to commands inputted via a specific switch.

8 Claims, 21 Drawing Sheets

(56) References Cited

OTHER PUBLICATIONS

"Use Mighty Mouse 200%", Mac Fan, vol. 13, No. 10, Oct. 2005, 6 pages.

English Translation of the International Preliminary Report on Patentability issued Nov. 1, 2012 in corresponding International Patent Application No. PCT/JP2010/054838.

Notice of Reason for Rejection, dated Sep. 10, 2013, in corresponding Japanese Application No. 2012-505414 (7 pp.).

* cited by examiner

| DESCRIPTION OF TRANSMISSION CODES |
|---|
| AMOUNT OF MOUSE MOVEMENT (X) |
| AMOUNT OF MOUSE MOVEMENT (Y) |
| RIGHT SWITCH (ON: 1) |
| LEFT SWITCH (ON: 1) |
| FRONT SWITCH (ON: 1) |
| REAR SWITCH (ON: 1) |

| | | CURSOR SHAPE | X-COORDINATE | Y-COORDINATE | DISTANCE |
|---|---|---|---|---|---|
| CURRENT CURSOR POSITION | | | 600 | 100 | |
| BUTTON COORDINATES | CLOSE | SHAPE 1 | 1200 | 700 | 849 |
| | MAXIMIZE | SHAPE 1 | 1150 | 700 | 814 |
| | MINIMIZE | SHAPE 1 | 1100 | 700 | 781 |

KEPT UPDATED

| | | CURSOR SHAPE | X-COORDINATE | Y-COORDINATE | DISTANCE |
|---|---|---|---|---|---|
| CURRENT CURSOR POSITION | | | 800 | 100 | |
| HANDLE COORDINATES | COPY | SHAPE 2 | 400 | 600 | 640 |
| | MOVE | SHAPE 3 | 450 | 600 | 672 |

KEPT UPDATED

FIG.11
SHAPE 1  SHAPE 2  SHAPE 3
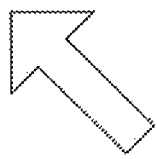
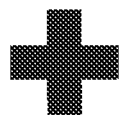
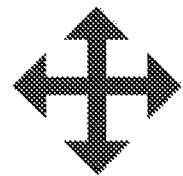
FIG.12
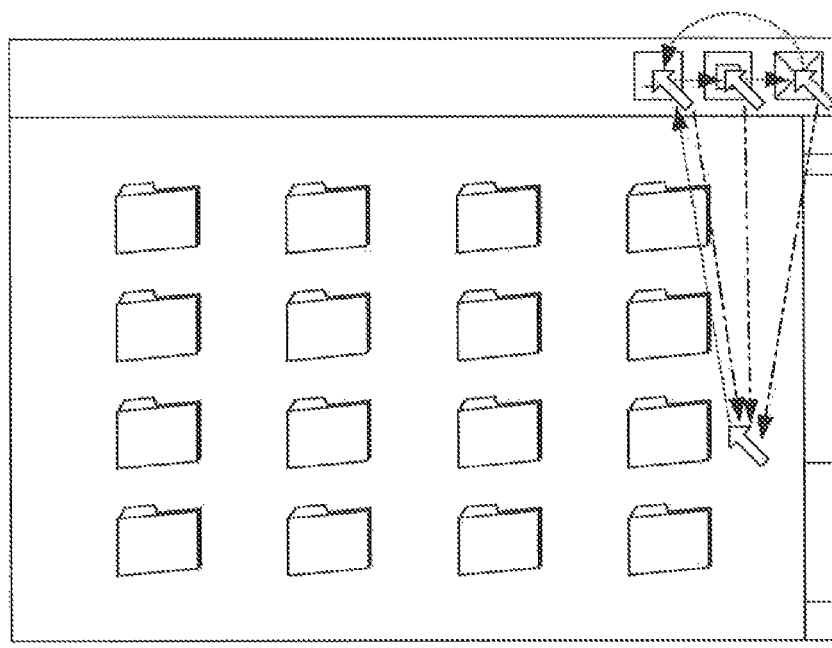
⋯⋯▶ MOVEMENT FOR FUNCTION SELECT COMMAND
- - - ▶ MOVEMENT FOR CANCEL COMMAND

OPERATION TARGET AREA

----▶ MOVEMENT FOR FUNCTION SELECT COMMAND

----▶ MOVEMENT FOR CANCEL COMMAND

| FUNCTION | CLOSE | MAXIMIZE | MINIMIZE |
|---|---|---|---|
| PRIORITY | 1 | 2 | 3 |

| DESCRIPTION OF TRANSMISSION CODES |
|---|
| AMOUNT OF MOUSE MOVEMENT (X) |
| AMOUNT OF MOUSE MOVEMENT (Y) |
| RIGHT SWITCH (ON: 1) |
| LEFT SWITCH (ON: 1) |
| RIGHT SIDE-SWITCH (ON: 1) |
| LEFT SIDE-SWITCH (ON: 1) |

INFORMATION PROCESSING DEVICE FOR CHANGING CURSOR DISPLAY POSITION, COMPUTER READABLE NON-TRANSITORY RECORDING MEDIUM, AND INFORMATION PROCESSING METHOD

CROSS-REFERENCE TO RELATED APPLICATION

This is a continuation of Application, filed under 35 U.S.C. §111(a) of International Application PCT/JP2010/054838, filed on Mar. 19, 2010, the contents of which are herein wholly incorporated by reference.

FIELD

Techniques disclosed by the present application relate to an information processing device, a computer readable non-transitory recording medium, and an information processing method for displaying a cursor on a display screen in accordance with operations of a pointing device.

BACKGROUND

Pointing devices are widely utilized by users for specifying a desired position on a screen of a display device. A cursor is displayed on the screen and its display position is moved as a pointing device is operated by the user. By operating the pointing device, the user can position the cursor at a specific position for working with a window displayed on a desktop of an Operating System (OS). When spreadsheet software is active, the user can position the cursor at a particular position for manipulating a cell of a spreadsheet.

For assisting users in such cursor positioning, a technique is known that automatically positions a cursor at a specific position on a screen when the cursor gets near the position. A technique is also known that controls the mobility of a pointing device for enhancing cursor position accuracy.

DOCUMENT OF PRIOR ART

Patent Literature

Patent Literature 1: Japanese Laid-Open Patent Publication No. 06-295225
Patent Literature 2: Japanese Laid-Open Patent Publication No. 2000-214980

SUMMARY

However, it can be sometimes difficult to position a cursor at a desired position even with use of the technique for assisting in cursor positioning. For example, when multiple specific positions are displayed adjacent to each other, the cursor possibly is not positioned at a position desired by the user. Display devices have smaller screens in recent years as computers have become smaller in size. On these small screens in particular, specific positions for acting on a window or a cell can often be adjacent to one another within a small area. In such a situation, the cursor might be positioned at a specific position that is displayed beside a position intended by the user.

Even with controlled mobility of a pointing device, the user can be required to be good at operating a pointing device because of a small-sized display screen.

According to an aspect of the embodiments, an information processing device includes: a display device; a pointing device; a cursor display unit that displays a cursor on a screen of the display device in accordance with operations of the pointing device; a first acquisition unit which acquires position information indicating a position, on the screen, of a function handle to which a function of processing a user interface object is assigned and which is displayed on the screen of the display device; and a position changing unit that changes a display position of the cursor such that the cursor on the screen is at the position indicated by the position information acquired by the first acquisition unit, in response to commands inputted via a specific switch.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 10 is a continuation of FIG. 9.

FIG. 11 illustrates example cursor shapes.

FIG. 12 is an illustration for describing movement of a cursor position onto a button in response to a function select command in the first embodiment.

FIG. 26 is a continuation of FIG. 25.

DESCRIPTION OF EMBODIMENTS

Embodiments of the invention will be described with reference to the drawings.

First Embodiment

Figure 1:
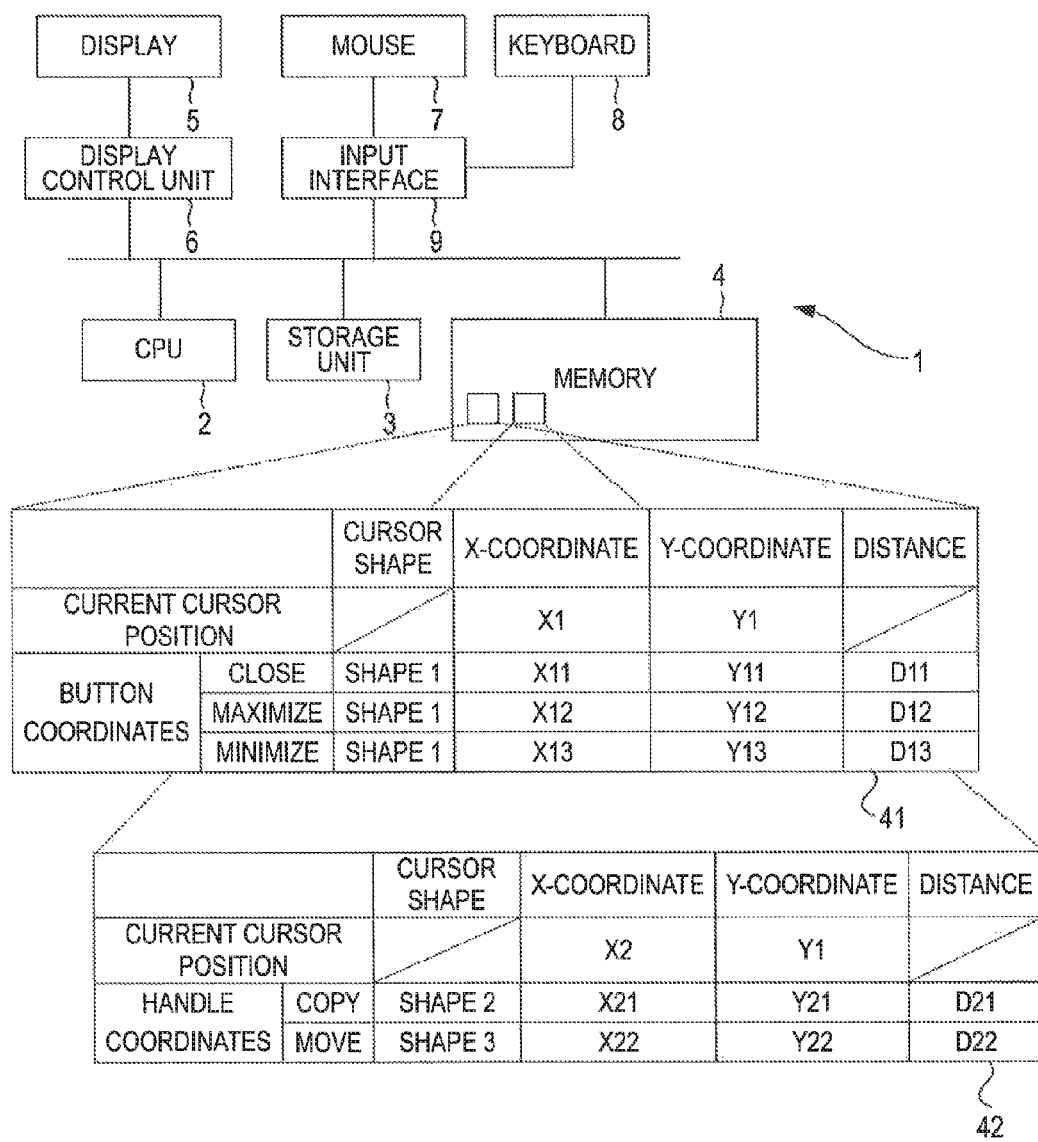
FIG. 1 illustrates a hardware configuration of an information processing device according to a first embodiment of the invention and an example of information maintained in a memory of the information processing device.

An information processing device according to a first embodiment of the invention will be described first. A configuration of an information processing device 1 according to the first embodiment is illustrated in FIG. 1.

The information processing device 1 includes a Central Processing Unit (CPU) 2, a storage unit 3, a memory 4, a display 5, a display control unit 6, a mouse 7, a keyboard 8, and an input interface 9. The CPU 2, the storage unit 3, memory 4, the display control unit 6, and the input interface 9 are connected with each other via buses. The CPU 2 is responsible for controlling the entire information processing device 1. The storage unit 3 may be a Hard Disk Drive (HDD) or a flash Solid State Drive (SSD) and is utilized as an auxiliary storage. The memory 4 is utilized as a main storage for the information processing device 1. The memory 4 maintains a button information table 41 and a handle information table 42 as described below.

The display 5 may be a Liquid Crystal Display (LCD). The display control unit 6 controls data for display on a screen of the display 5 as instructed by the CPU 2. In the first embodiment of the invention, the mouse 7 is adopted as a pointing device. The mouse 7 and the keyboard 8 accept operational commands from the user. The input interface 9 conveys a signal corresponding to the user's operation with the mouse 7 and keyboard 8 to the CPU 2.

Figures 2, 3:
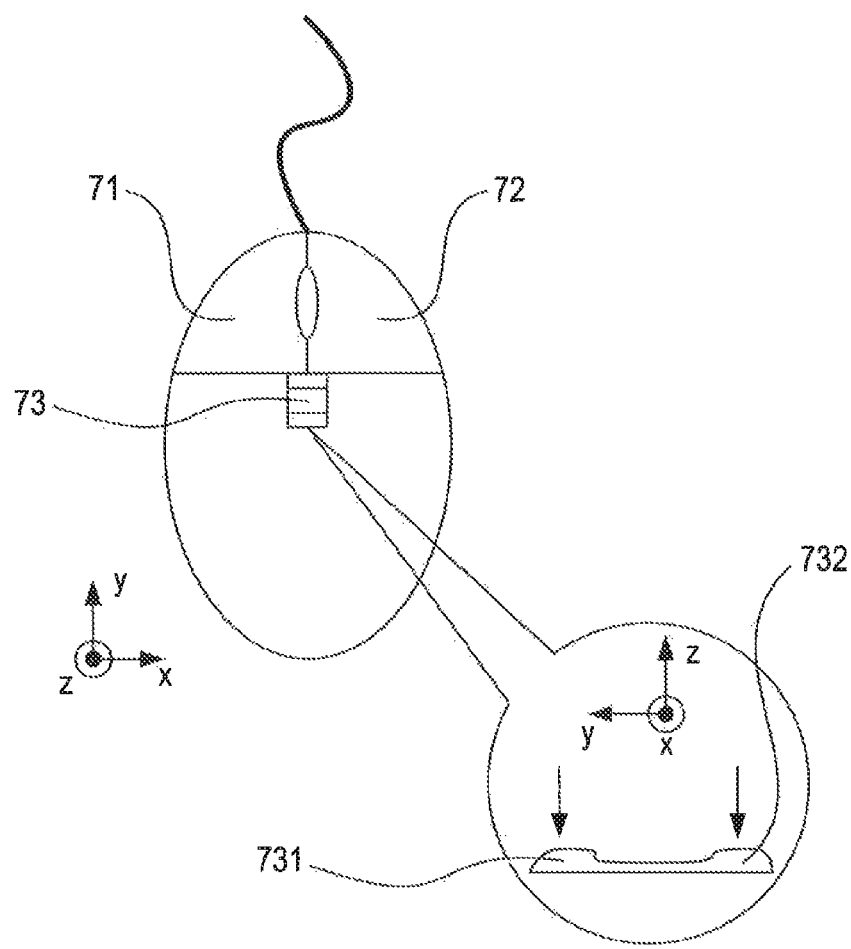
FIG. 2 illustrates an example of a mouse with a center switch according to the first embodiment.
FIG. 3 illustrates transmission codes sent by a mouse with a center switch according to the first embodiment.

An example of the mouse 7 will be described with reference to FIGS. 2 and 3. As illustrated in FIG. 2, the mouse 7 has a center switch 73 in addition to a left switch 71 and a right switch 72. The center switch 73 has two switches, a front switch 731 and a rear switch 732. The front switch 731 is assigned a function select command, and the rear switch 732 is assigned a cancel command. The function select and cancel commands will be discussed below. The mouse 7 with the center switch 73 sends transmission codes of FIG. 3 to the CPU 2 in response to user's operations.

Figures 4, 5:
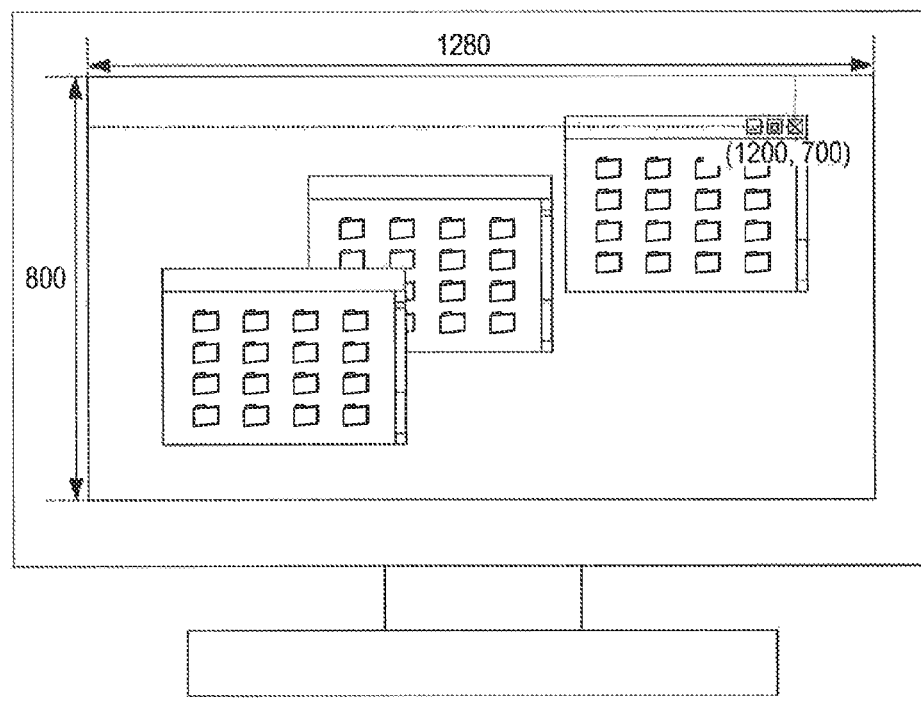
FIG. 4 illustrates an exemplary display according to the first embodiment.
FIG. 5 illustrates an example of a button information table according to the first embodiment.

Next, an example of the display 5 will be described with reference to FIG. 4. As illustrated in FIG. 4, the display 5 has a resolution of 800 pixels long and 1,280 pixels wide. The positions of function handles and a cursor on a screen are displayed in conformity with the resolution of the display 5. "Function handles" include buttons for manipulating a window on a desktop and/or handles for cells of spreadsheet software. To function handles, functions relating to specific objects such as windows and cells are assigned.

Figures 6, 7:
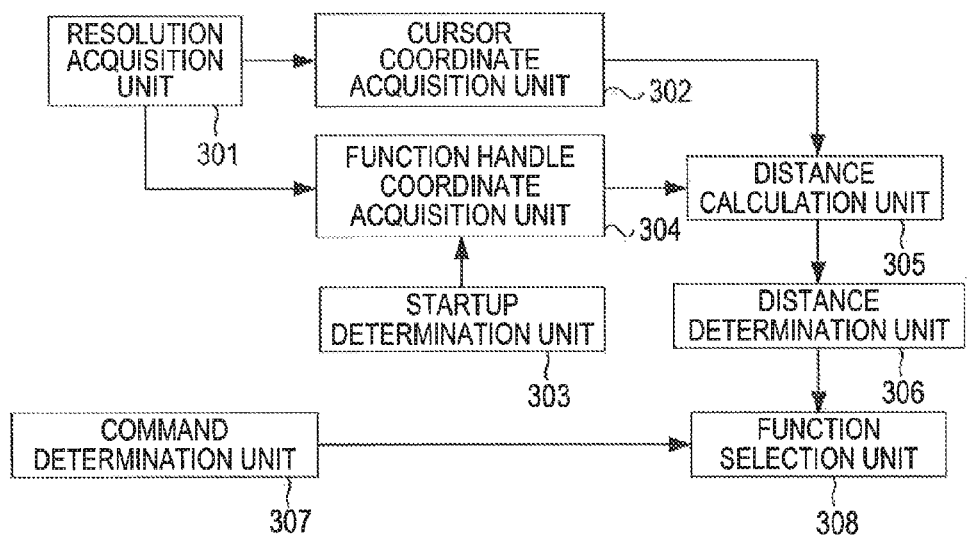
FIG. 6 illustrates an example of a handle information table according to the first embodiment.
FIG. 7 illustrates a functional configuration of the information processing device according to the first embodiment.

Next, the button information table 41 and handle information table 42 maintained in the memory 4 are described with reference to FIGS. 1, 5, and 6. The memory 4 stores button information in the form of the button information table 41. The memory 4 also stores handle information in the form of the handle information table 42. Button information indicates cursor and button positions, distances between buttons and the cursor, and cursor shapes that are taken when the cursor is at a button position. Handle information indicates cursor and handle positions, distances between handles and the cursor, and cursor shapes that are taken when the cursor is at a handle position. In the first embodiment, cursor, button, and handle positions are represented by an X-coordinate indicative of horizontal pixels on the display 5 and a Y-coordinate indicative of vertical pixels, and are kept updated. In the following description, the distance between a button and the cursor will be referred to as button distance, and the distance between a handle and the cursor will be referred to as handle distance.

Next, the functional configuration of the information processing device according to the first embodiment will be described with reference to FIG. 7. A resolution acquisition unit 301 acquires the resolution of the display 5 as the reference for cursor, button, and handle positions. A cursor coordinate acquisition unit 302 acquires the coordinates of the cursor. A startup determination unit 303 determines whether a window or a specific application has been started up. In the first embodiment, the specific application is spreadsheet software. A function handle coordinate acquisition unit 304 acquires the coordinates of a function handle. A distance calculation unit 305 calculates the distance between the cursor and the function handle based on the cursor coordinates acquired by the cursor coordinate acquisition unit 302 and the function handle coordinates acquired by the function handle coordinate acquisition unit 304. The distance is calculated based on an equation $|Xa-X1|^2+|Ya-Y1|^2$, where $(Xa,Ya)$ is the position of the function handle and $(X1,Y1)$ is the cursor position. A distance determination unit 306 determines whether the handle distance is equal to or greater than the button distance. A command determination unit 307 determines whether a switch having either a function select or cancel command assigned thereto has been pressed on the mouse 7 based on the transmission codes mentioned above. A function selection unit 308 moves the cursor to the position of a predetermined function handle when a function select command has been given. Specifically, "move" means to change the coordinate position of the cursor.

The resolution acquisition unit 301, the cursor coordinate acquisition unit 302, the startup determination unit 303, the function handle coordinate acquisition unit 304, the distance calculation unit 305, the distance determination unit 306, the command determination unit 307, and the function selection unit 308 are implemented as functions through cooperative operation of the CPU 2 and the memory 4. For example, they may be implemented as input device drivers to operate on the OS of the information processing device 1.

Next, operation of the information processing device 1 according to the first embodiment will be described with reference to FIG. 8 to FIG. 14.

Figure 8:
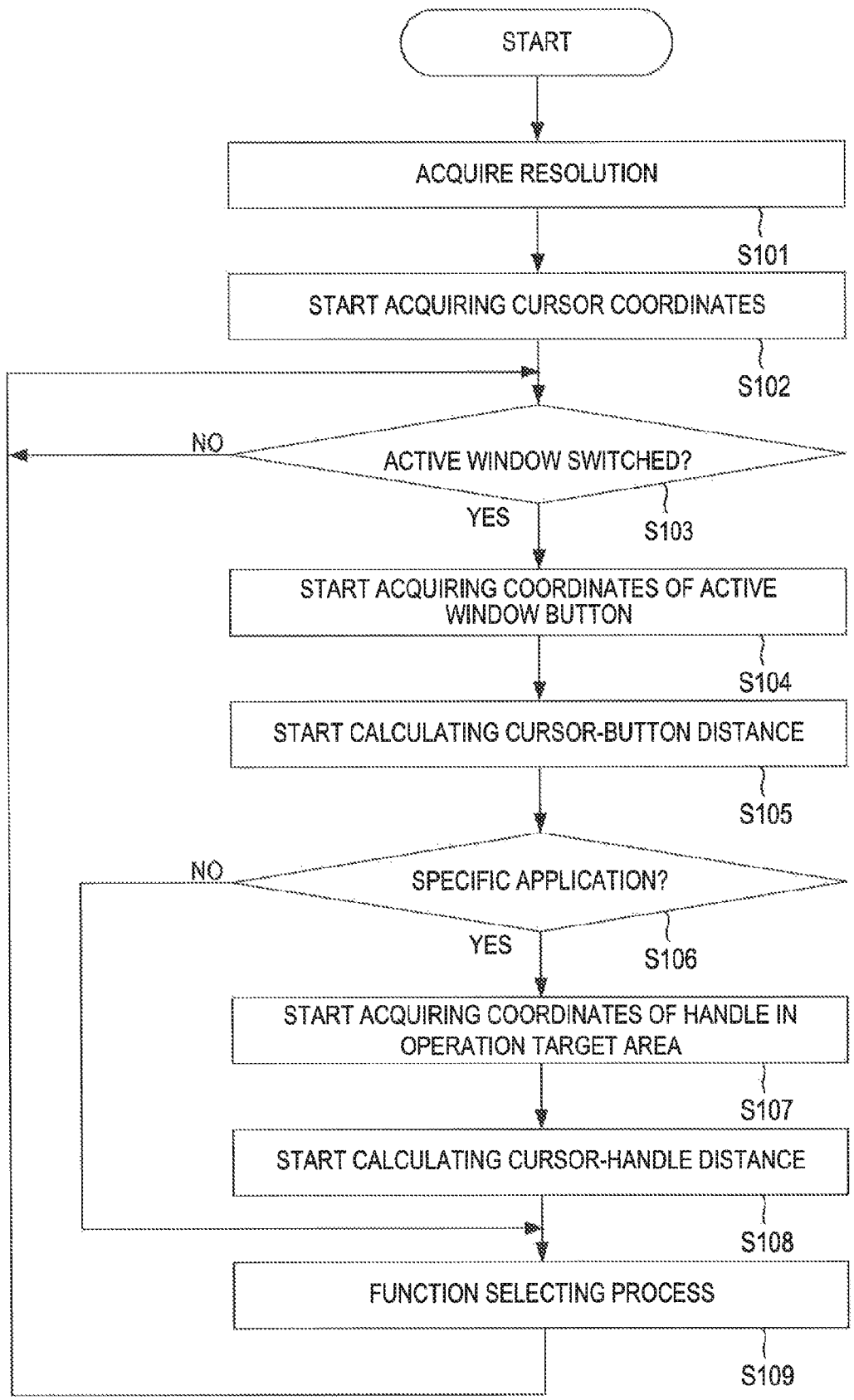
FIG. 8 is a flowchart illustrating the operations of the information processing device according to the first embodiment.

Operations of the information processing device 1 are illustrated in FIG. 8. First, the resolution acquisition unit 301 acquires the resolution of the display (step S101). The cursor coordinate acquisition unit 302 then acquires the cursor coordinates (step S102). Then, the startup determination unit 303 determines whether an active window has been switched (step S103).

If the active window has been switched (step S103: YES), the function handle coordinate acquisition unit 304 starts to acquire the coordinates of a button of the active window (step S104). Next, the distance calculation unit 305 calculates the distance between the cursor and the button (step S105). The button coordinates acquired and the cursor-button distance calculated are stored in the memory 4 as the button information mentioned above. Then, the startup determination unit 303 determines whether the active window is a window of the specific application (step S106).

When the active window is a window of the specific application (step S106: YES), the function handle coordinate acquisition unit 304 starts to acquire the coordinates of a handle present in an operation target area (step S107). Then, the distance calculation unit 305 calculates the distance between the cursor and the handle (step S108). The handle coordinates acquired and the cursor-handle distance calculated are stored in the memory 4 as the aforementioned handle information. The information processing device 1 then executes a function selecting process described below (step S109). After executing the function selecting process, the startup determination unit 303 determines again whether the active window has been switched (step S103).

When the active window is not a window of the specific application (step S106: NO), the information processing device 1 executes a function selecting process (step S109).

If the active window is not switched in the determination at step S103 (step S103: NO), the startup determination unit 303 determines again whether the active window has been switched (step S103).

Figure 9:
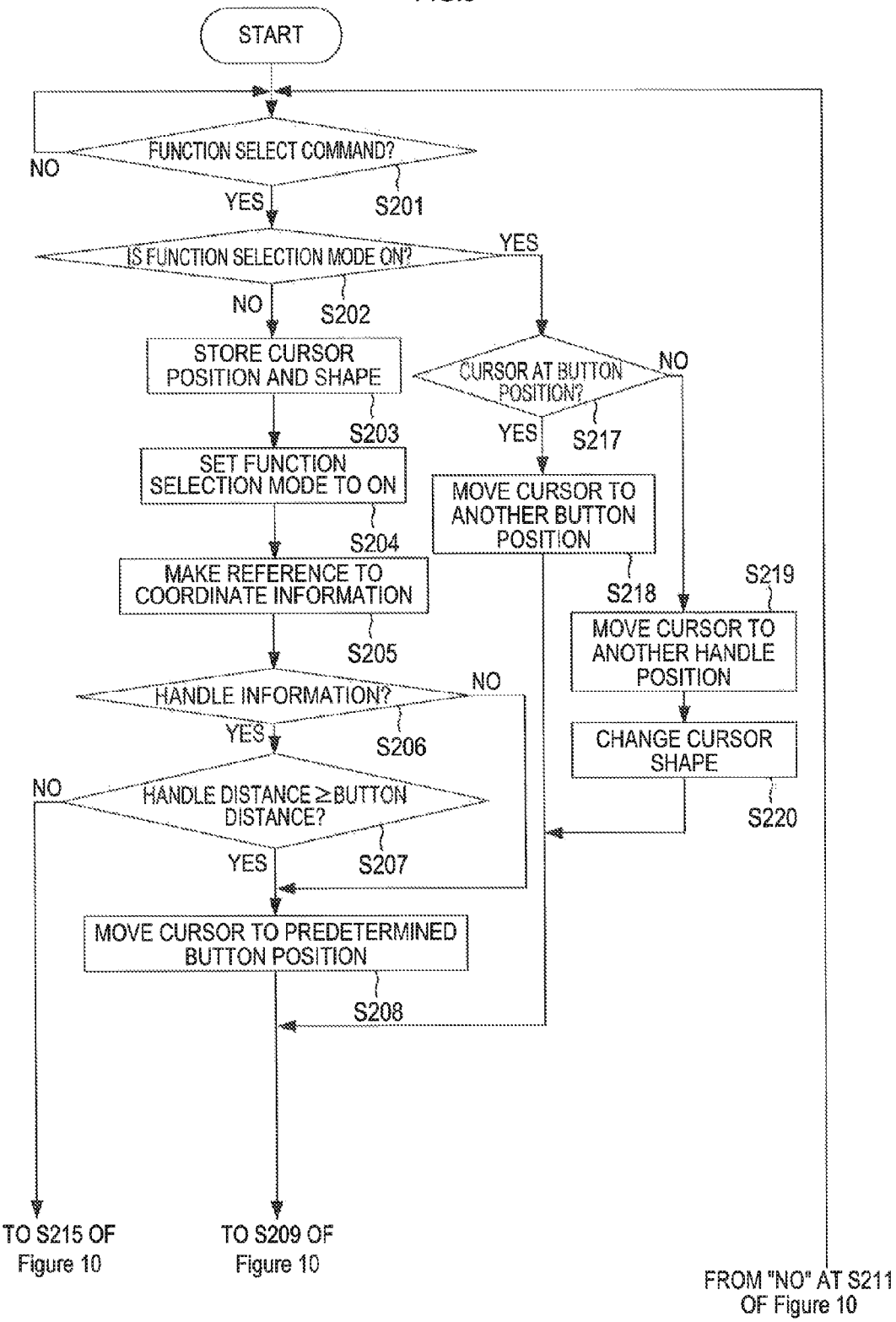
FIG. 9 is a flowchart illustrating the actions of a function selecting process according to the first embodiment.
Figure 10:
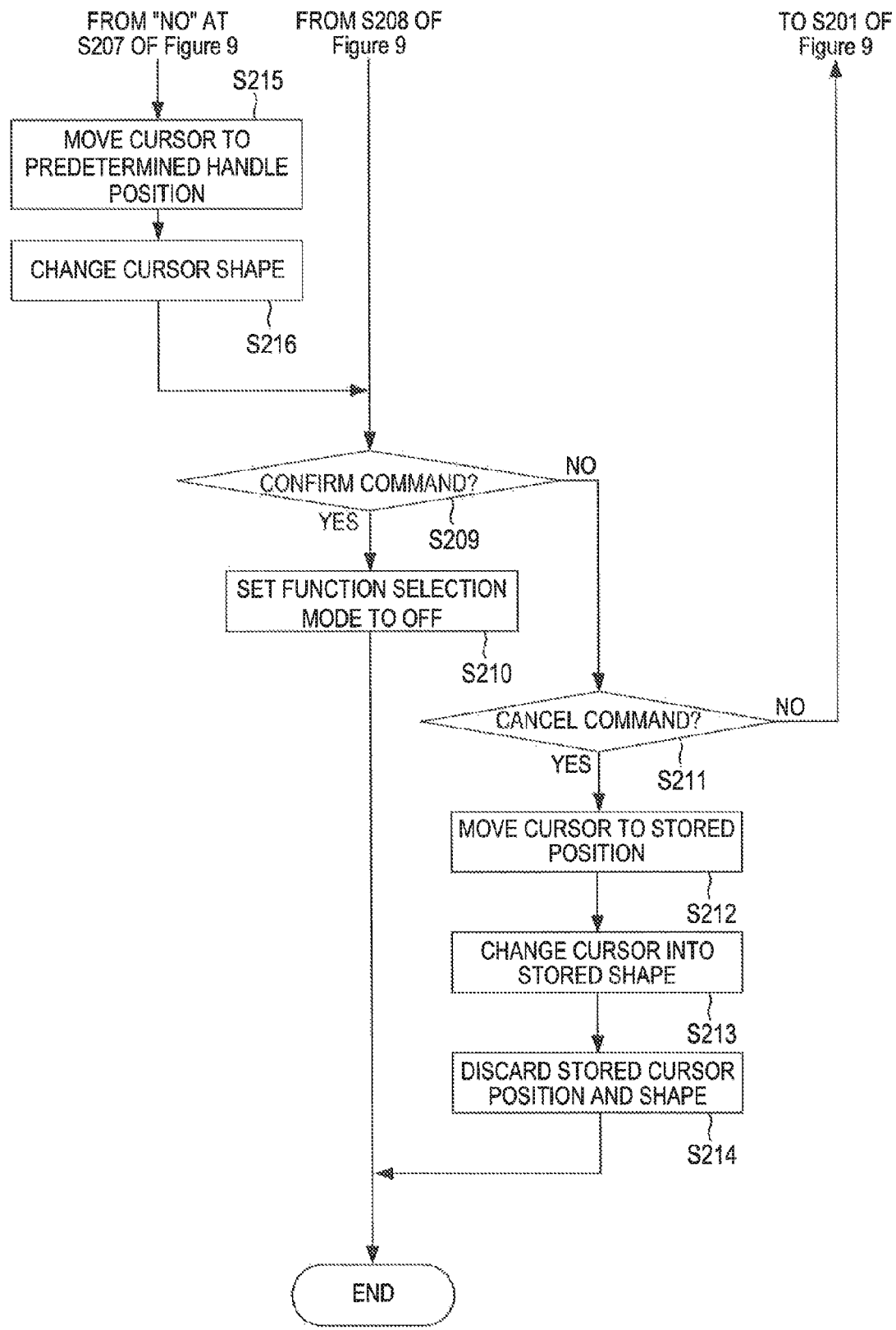
FIG. 10 is a flowchart illustrating the actions of a function selecting process according to the first embodiment.
Figures 13, 14:
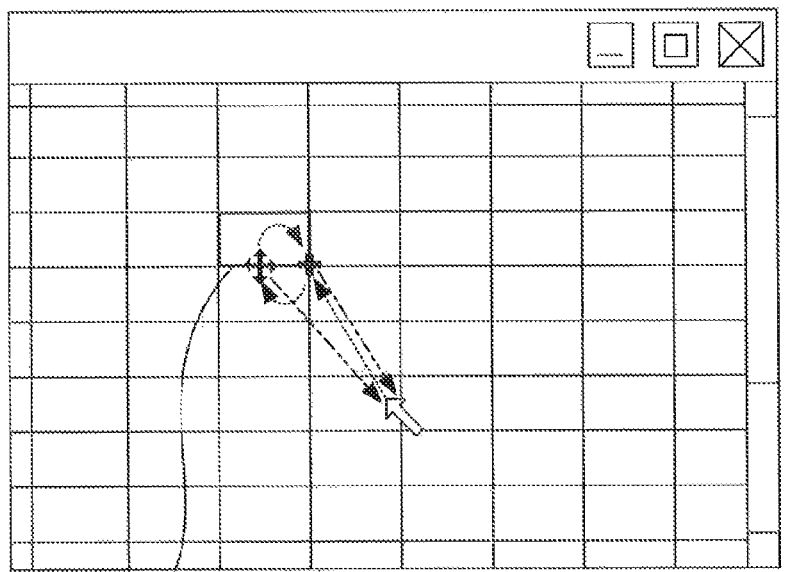
FIG. 13 is an illustration for describing movement of a cursor position onto a handle in response to a function select command in the first embodiment.
FIG. 14 illustrates priority information in the first embodiment.

Next, actions of the function selecting process in the first embodiment will be described with reference to FIGS. 9 and 10. FIG. 11 illustrates various cursor shapes. FIG. 12 illustrates movement of the cursor position onto buttons in response to a function select command. FIG. 13 illustrates movement of the cursor position onto a handle in response to a function select command. FIG. 14 illustrates an example of priority information. FIGS. 9 and 10 assume that a function selection mode, which indicates whether a function select command is given for the first time or not, is set to OFF in relation to selection of a function handle. The function selection mode being ON means that the function select command is given not for the first time, and being OFF means that the function select command is given for the first time.

As illustrated in FIG. 9, the command determination unit 307 first determines whether a function select command is given (step S201).

If a function select command is given (step S201: YES), the function selection unit 308 determines whether the function selection mode is ON (step S202).

When the function selection mode is not ON (step S202: NO), the function selection unit 308 stores the position and shape of the cursor in an area in the memory 4 different from the area storing coordinate information (step S203). The function selection unit 308 then sets the function selection mode to ON (step S204), makes reference to coordinate information (step S205), and determines whether there is handle information (step S206).

If there is handle information (step S206: YES), the distance determination unit 306 determines whether the handle distance is equal to or greater than the button distance (step S207).

If the handle distance is equal or greater than the button distance (step S207: YES), the function selection unit 308 moves the cursor to a predetermined button position (step S208). Then, the command determination unit 307 determines whether a confirm command is given (step S209).

If a confirm command is given (step S209: YES), the function selection unit 308 sets the function selection mode to OFF (step S210), and ends the function selecting process.

If a confirm command is not given (step S209: NO), the command determination unit 307 determines whether a cancel command is given (step S211).

If a cancel command is given (step S211: YES), the function selection unit 308 moves the cursor to the position that was stored in the memory 4 at step S203 (step S212), and changes the cursor into the shape stored in the memory 4 at step S203 (step S213). The function selection unit 308 then discards the position and shape of the cursor that were stored in memory 4 at step S203 (step S214), and ends the function selecting process.

If a cancel command is not given (step S211: NO), the command determination unit 307 again determines whether a function select command is given (step S201).

If the handle distance is smaller than the button distance in the determination at step S207 (step S207: NO), the function selection unit 308 moves the cursor to a predetermined handle position (step S215). The function selection unit 308 further changes the cursor into a shape corresponding to the handle position to which the cursor has been moved (step S216). Next, the command determination unit 307 determines whether a confirm command is given (step S209). The present embodiment assumes that the cursor shape changes between three shapes, shapes 1 through 3, as illustrated in FIG. 11.

If there is no handle information in the determination at step S206 (step S206: NO), the function selection unit 308 moves the cursor to a predetermined button position (step S208).

If the function selection mode is ON in the determination at step S202 (step S202: YES), the function selection unit 308 determines whether the cursor is at a button position (step S217).

If the cursor is at a button position (step S217: YES), the function selection unit 308 moves the cursor to another button position (step S218), and the command determination unit 307 determines again whether a confirm command is given (step S209).

When the cursor is not at a button position, that is, it is at a handle position (step S217: NO), the function selection unit 308 moves the cursor to another handle position (step S219). The function selection unit 308 further changes the cursor into the shape corresponding to the handle position to which the cursor has been moved (step S220), and the command determination unit 307 again determines whether a confirm command is given (step S209).

If a function select command is not given in the determination at step S201 (step S201: NO), the command determination unit 307 again determines whether a function select command is given (step S201).

In this function selecting process, when the cursor is positioned near buttons of the active window, the cursor position is moved onto the buttons in response to function select commands and returns to the original position upon a cancel command as illustrated in FIG. 12. When the cursor is positioned near an operation target area, the cursor position is moved onto handles upon a function select command and returns to the original position upon a cancel command as illustrated in FIG. 13. When there are more than one function handle to which the cursor can be moved, priority information that associates priorities to function handles is stored in the storage unit 3 as illustrated in FIG. 14, and the order of cursor movement is determined based on the priority information. When there is more than one button or handle, the cursor will be moved to the button or handle that is nearest to the cursor position when there is a function select command.

As described above, the cursor is moved onto function handles such as buttons or handles in response to a function select command, thereby eliminating the necessity to automatically correct the cursor movement. Also, by not correcting the cursor movement, cursor movements not intended by the user can be prevented.

Figures 15, 16:
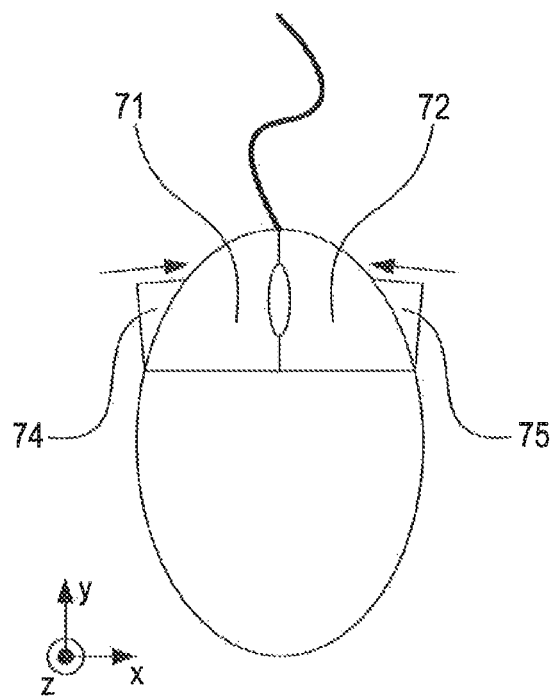
FIG. 15 illustrates a variation of a mouse in the first embodiment.
FIG. 16 illustrates transmission codes sent by the variation mouse.

The mouse 7 may also have a left side-switch 74 and a right side-switch 75 in place of the center switch 73, as illustrated in FIG. 15. In this case, the left side-switch is assigned the function select command, and the right side-switch is assigned the cancel command. A mouse 7 having such side switches sends the transmission codes illustrated in FIG. 16 to the CPU 2. In either a mouse with the center switch 73 or a mouse with side switches, the aforementioned confirm command is assigned to the left switch 71 and the right switch 72.

Figure 17:
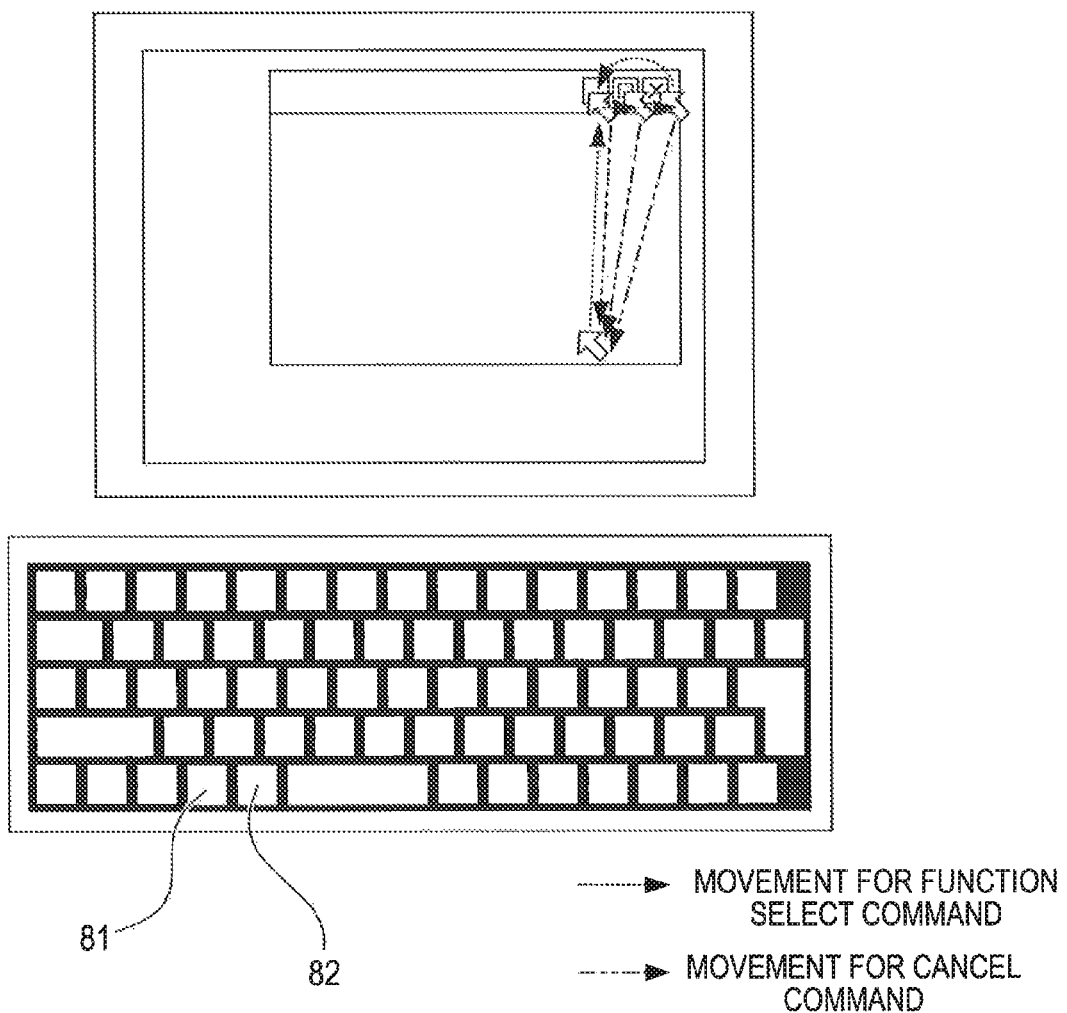
FIG. 17 illustrates a keyboard to be adopted with the variation of the first embodiment.

Although function select command and cancel commands are assigned to the switches of the mouse 7 in the first embodiment, these commands may also be assigned to predetermined keys 81, 82 of the keyboard 8 as illustrated in FIG. 17. The technique disclosed in the first embodiment is also applicable to an information processing device connected with a mouse having only one or two buttons due to assignment of the function select command and cancel command to the keys 81 and 82 respectively.

The above-described first embodiment uses a mouse as a pointing device. The invention is not limited thereto; a touch pad or trackball may be adopted.

The mouse 7 described above has the center switch 73. However, the above-described operations can be achieved also with a mouse not having such a switch. In that case, the process from step S101 of FIG. 8 will be executed when the cursor remains at one position for a certain time period. For selection of a function handle, a wheel provided in the center of the mouse may be used.

When the information processing device 1 is implemented by a portable computer such as a notebook computer and the user operates two screens including the display integrally formed with the portable computer and an external display connected to the computer, information for distinguishing between the two displays may be maintained for each function handle.

The above-described first embodiment adopts spreadsheet software as the specific application. However, the specific application is not limited to spreadsheet software. Any software program that displays a screen including an operation target area containing function handles may be adopted as the specific application. The present invention can be applied such that a screen including an operation target area containing function handles is the object of coordinate acquisition.

Second Embodiment

Figure 18:
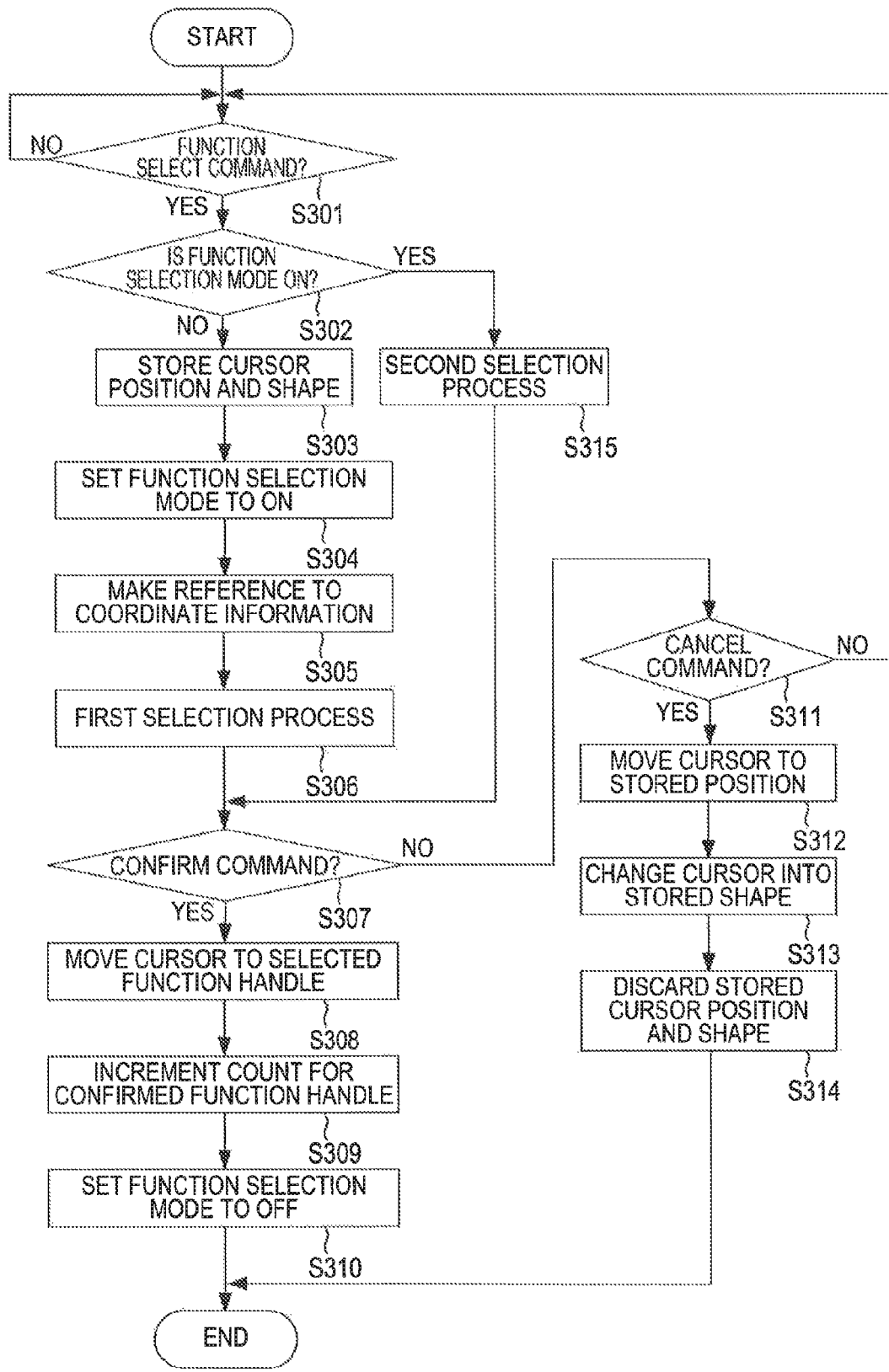
FIG. 18 is a flowchart illustrating the actions of a function selecting process according to a second embodiment of the invention.
Figures 19, 20:
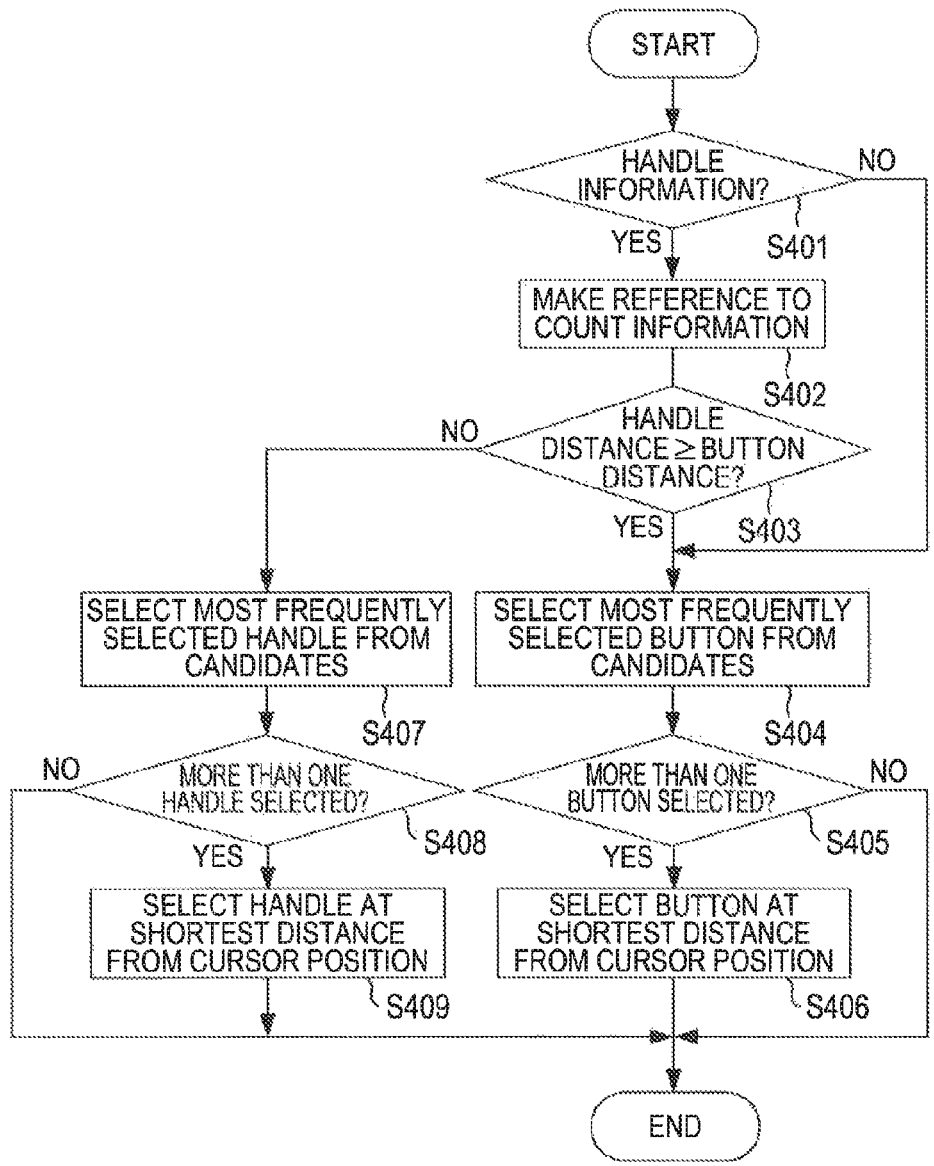
FIG. 19 illustrates an example of count information according to the second embodiment.
FIG. 20 is a flowchart illustrating the actions of a first selecting process according to the second embodiment.

While the above-described first embodiment describes that the order of cursor movement in response to a function select command is based on cursor position and priority information, the order of cursor movement in a second embodiment is based on the number of times the user selects functions. The following description will describe operations of the information processing device that are different from the first embodiment. FIG. 18 is a flowchart illustrating actions of function selecting process in the second embodiment. FIG. 19 illustrates count information.

As illustrated in FIG. 18, the command determination unit 307 first determines whether a function select command has been given (step S301).

If a function select command is given (step S301: YES), the function selection unit 308 determines whether the function selection mode is ON (step S302).

If the function selection mode is not ON (step S302: NO), the function selection unit 308 stores the position and shape of the cursor in an area of the memory 4 that is different from the area in which coordinate information is stored (step S303). The function selection unit 308 then sets the function selection mode to ON (step S304), makes reference to coordinate information (step S305), and executes a first selecting process described below (step S306). The first selecting process selects a function handle that is most frequently selected while the function selection mode is ON. After executing the first selecting process, the command determination unit 307 determines whether a confirm command has been given (step S307).

If a confirm command is given (step S307: YES), the function selection unit 308 moves the cursor to the function handle selected by the first selecting process (step S308), and increments the count for that function handle within count information (step S309). The count information associates a function handle with the number of times it is selected, as illustrated in FIG. 19. The count information is stored in the storage unit 3. The function selection unit 308 then sets the function selection mode to OFF (step S310), and ends the function selecting process.

If a confirm command is not given (step S307: NO), the command determination unit 307 determines whether a cancel command is given (step S311).

When a cancel command is given (step S311: YES), the function selection unit 308 moves the cursor to the position that was stored in the memory 4 at step S303 (step S312), and changes the cursor shape to the shape stored in the memory 4 at step S303 (step S313). The function selection unit 308 then discards the position and shape of the cursor that were stored in the memory 4 at step S303 (step S314), and ends the function selecting process.

If the function selection mode is ON in the determination at step S302 (step S302: YES), the function selection unit 308 executes a second selecting process described below (step S315). The second selecting process selects a function handle that is most frequently selected while the function selection mode is OFF. Then, the command determination unit 307 determines whether a confirm command is given (step S307).

The first selecting process will be now described. FIG. 20 is a flowchart illustrating the actions of the first selecting process.

As illustrated in FIG. 20, the function selection unit 308 first determines whether there is handle information (step S401).

If there is handle information (step S401: YES), the function selection unit 308 makes reference to count information (step S402), and the distance determination unit 306 determines whether the handle distance is equal to or greater than the button distance (step S403).

If the handle distance is equal to or greater than the button distance (step S403: YES), the function selection unit 308 selects a button that is most frequently selected in count information from candidates for selection (step S404). It is assumed that all buttons are included in the candidates for selection in the first selecting process. The function selection unit 308 determines whether more than one button has been selected (step S405).

If more than one button is selected (step S405: YES), the function selection unit 308 selects a button that is positioned at the shortest distance from the cursor position from among the selected buttons (step S406), and ends the first selecting process.

If only one button has been selected (step S405: NO), the function selection unit 308 ends the first selecting process.

If the handle distance is smaller than the button distance in the determination at step S403 (step S403: NO), the function selection unit 308 selects a handle that is most frequently selected in count information from the candidates for selection (step S407). It is assumed that all buttons are included in the candidates for selection in the first selecting process. The function selection unit 308 determines whether more than one buttons has been selected (step S408).

If more than one button has been selected (step S408: YES), the function selection unit 308 selects a handle that is positioned at the shortest distance from the cursor position from among the selected handles (step S409), and ends the first selecting process.

If there is no handle information in the determination at step S401 (step S401: NO), the function selection unit 308 selects a button that is most frequently selected in count information from the candidates for selection (step S404).

Figure 21:
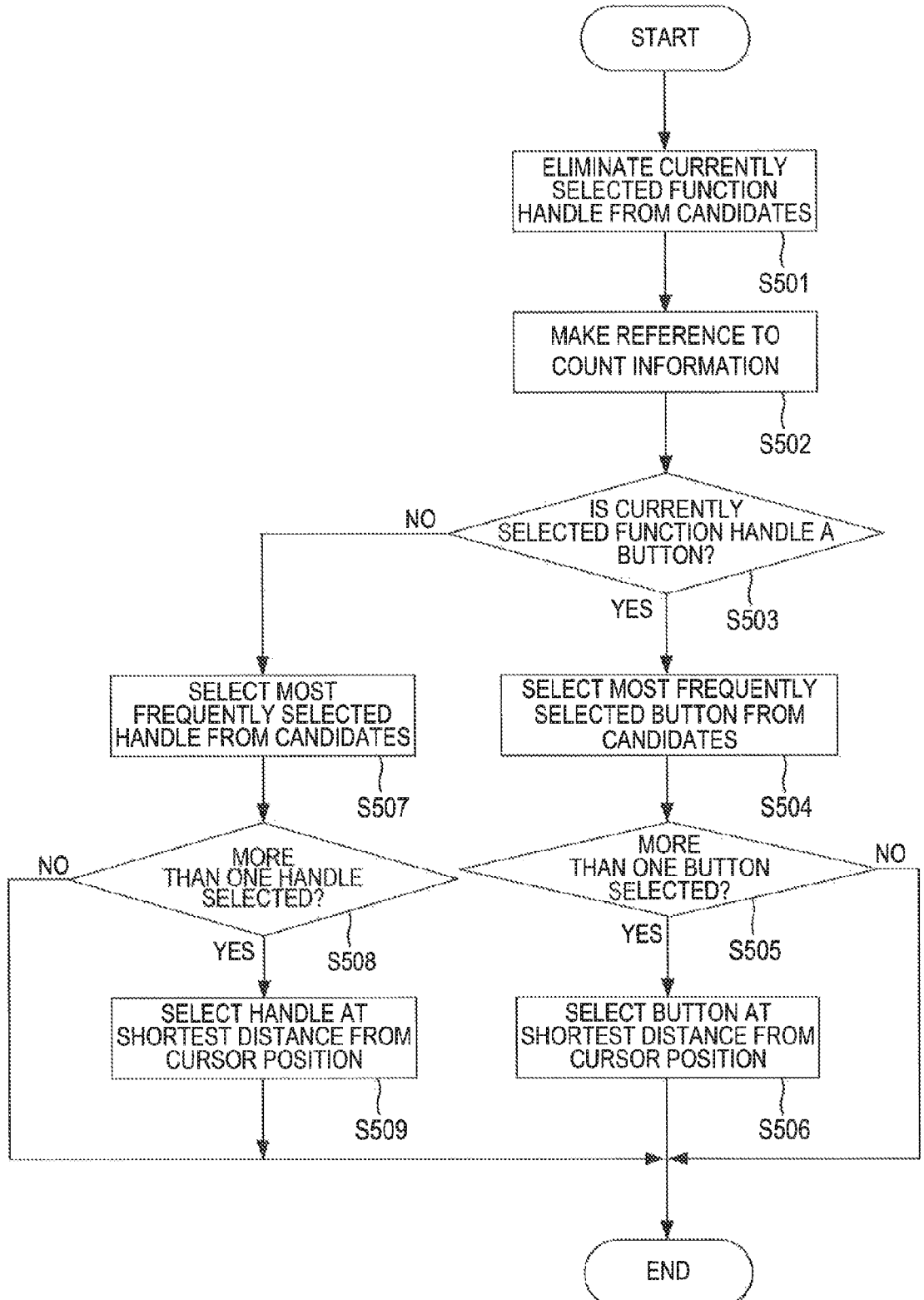
FIG. 21 is a flowchart illustrating the actions of a second selecting process according to the second embodiment.

The actions of the second selecting process will be now described. FIG. 21 is a flowchart illustrating the actions of the second selecting process.

As illustrated in FIG. 21, the function selection unit 308 first eliminates the currently selected function handle from the candidates for selection (step S501), makes reference to count information (step S502), and determines whether the currently selected function handle is a button (step S503).

If the currently selected function handle is a button (step S503: YES), the function selection unit 308 selects a button that is most frequently selected in count information from the candidates for selection (step S504), and determines whether more than one button has been selected (step S505).

If more than one button has been selected (step S505: YES), the function selection unit 308 selects a button that is positioned at the shortest distance from the cursor position from among the selected buttons (step S506), and ends the second selecting process.

If only one button has been selected (step S505: NO), the function selection unit 308 ends the second selecting process.

If the currently selected function handle is not a button in the determination at step S503 (step S503: NO), the function selection unit 308 selects a handle that is most frequently selected in count information from the candidates for selection (step S507), determines whether more than one handle has been selected (step S508).

If more than one handle has been selected (step S508: YES), the function selection unit 308 selects a handle that is positioned at the shortest distance from the cursor position from among the selected handles (step S509), and ends the second selecting process.

If only one handle has been selected (step S508: NO), the function selection unit 308 ends the second selecting process.

As described above, since the cursor is moved in the order of most to least frequently selected functions in response to a function select command, the user can preferentially select a frequently used function.

Third Embodiment

A third embodiment is different from the first embodiment in that it displays a list of functions available for selection when a function is selected through a function select command. The following description will illustrate the functional configuration and operations of an information processing device according to the third embodiment that are different from the first embodiment.

Figure 22:
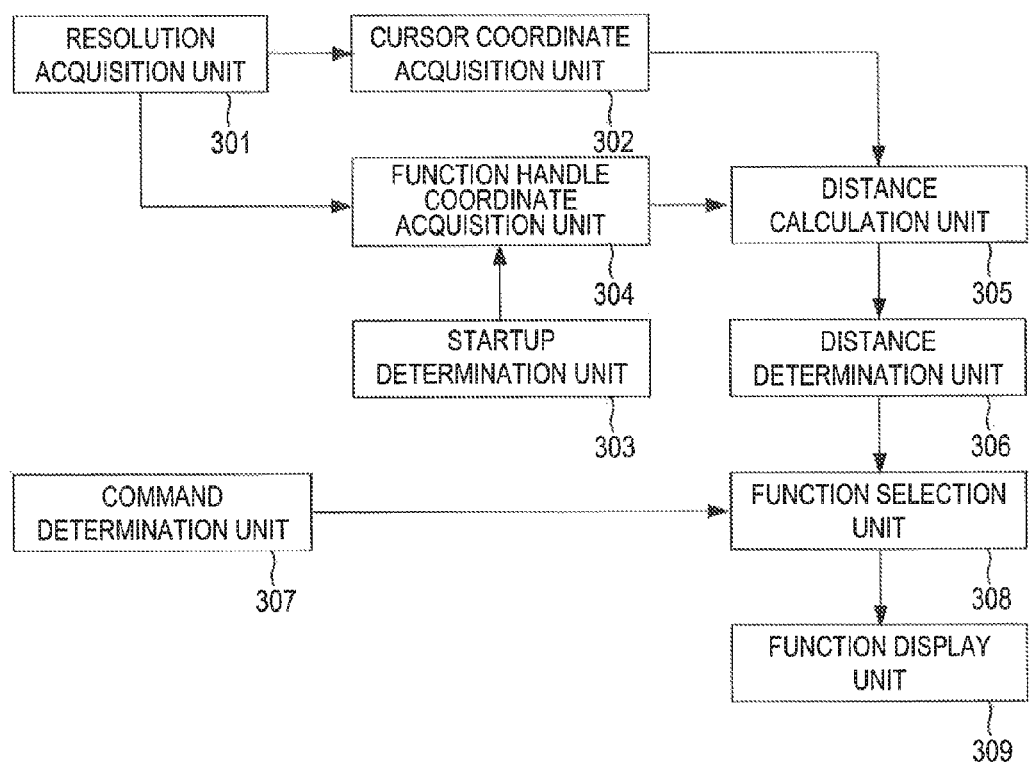
FIG. 22 illustrates a functional configuration of an information processing device according to a third embodiment of the invention.
Figure 23:
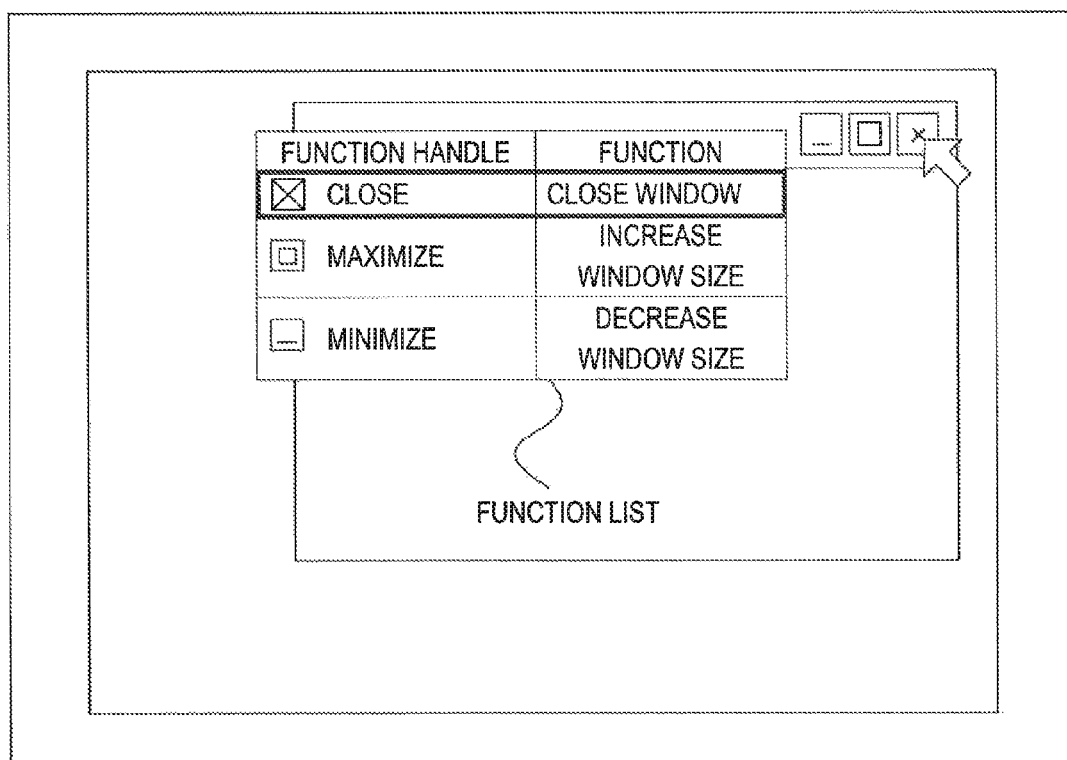
FIG. 23 illustrates an example of a function list that is displayed on a display screen in the third embodiment.

The functional configuration of the information processing device according to the third embodiment is described first. FIG. 22 illustrates a functional configuration of the information processing device according to the third embodiment. FIG. 23 illustrates a function list.

As illustrated in FIG. 22, the information processing device 1 of the third embodiment includes a function display unit 309, in addition to the resolution acquisition unit 301, cursor coordinate acquisition unit 302, startup determination unit 303, function handle coordinate acquisition unit 304, distance calculation unit 305, distance determination unit 306, command determination unit 307, and function selection unit 308. The function display unit 309 displays such a function list as illustrated in FIG. 23 in response to a function select command. The function list is listing of functions that can be selected through a function select command, associating functions with their descriptions. In the function list, items of a currently selected function are displayed in a different manner than those of the other functions.

Figure 24:
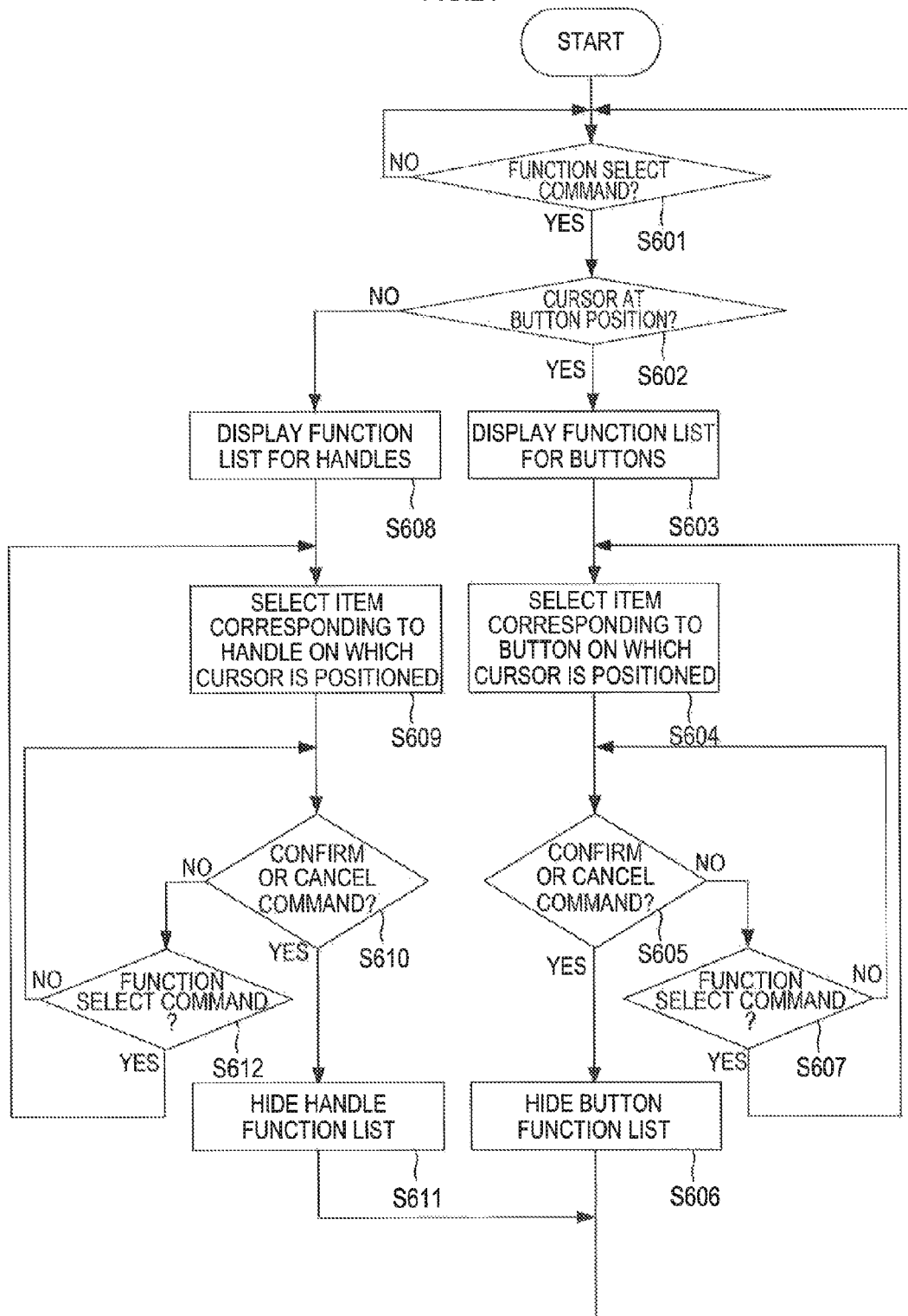
FIG. 24 is a flowchart illustrating the actions of a function selecting process according to the third embodiment.

Next, the actions of a function display process in the third embodiment will be described. FIG. 24 is a flowchart illustrating the actions of a function display process in the third embodiment.

As illustrated in FIG. 24, the command determination unit 307 first determines whether a function select command has been given (step S601).

If a function select command is given (step S601: YES), the function display unit 309 determines whether the cursor is at a button position (step S602).

If the cursor is at a button position (step S602: YES), the function display unit 309 displays a function list for the buttons of the active window (step S603), and selects an item corresponding to the button on which the cursor is positioned in the function list (step S604). Then, the command determination unit 307 determines whether a confirm command or a cancel command is given (step S605).

If either a confirm command or a cancel command is given (step S605: YES), the function display unit 309 hides the function list being displayed (step S606). Then, the command determination unit 307 determines whether a function select command is given (step S601).

If neither a confirm command nor a cancel command is given (step S605: NO), the command determination unit 307 determines whether a function select command is given (step S607).

If a function select command is given (step S607: YES), the command determination unit 307 selects an item corresponding to the button on which the cursor is positioned in the function list (step S604).

If a function select command is not given (step S607: NO), the command determination unit 307 again determines whether a confirm command or a cancel command is given (step S605).

When the cursor is not at a button position in the determination at step S602 (step S602: NO), the function display unit 309 displays a function list for handles present in the operation target area (step S608), and selects an item corresponding to the handle on which the cursor is positioned (step S609). Then, the command determination unit 307 determines whether a confirm command or a cancel command is given (step S610).

If a confirm command or a cancel command is given (step S610: YES), the function display unit 309 hides the function list being displayed (step S611). Then, the command determination unit 307 again determines whether a function select command is given (step S601).

If neither a confirm command nor a cancel command is given (step S610: NO), the command determination unit 307 determines whether a function select command is given (step S612).

If a function select command is given (step S612: YES), the function display unit 309 selects an item corresponding to the button on which the cursor is positioned (step S609).

If a function select command is not given (step S612: NO), the command determination unit 307 again determines whether a confirm command or a cancel command is given (step S610).

If a function select command is not given in the determination at step S601 (step S601: NO), the command determination unit 307 again determines whether a function select command is given (step S601).

As described above, display of a function list in response to a function select command allows the user to ascertain the currently selected function.

Fourth Embodiment

Figure 25:
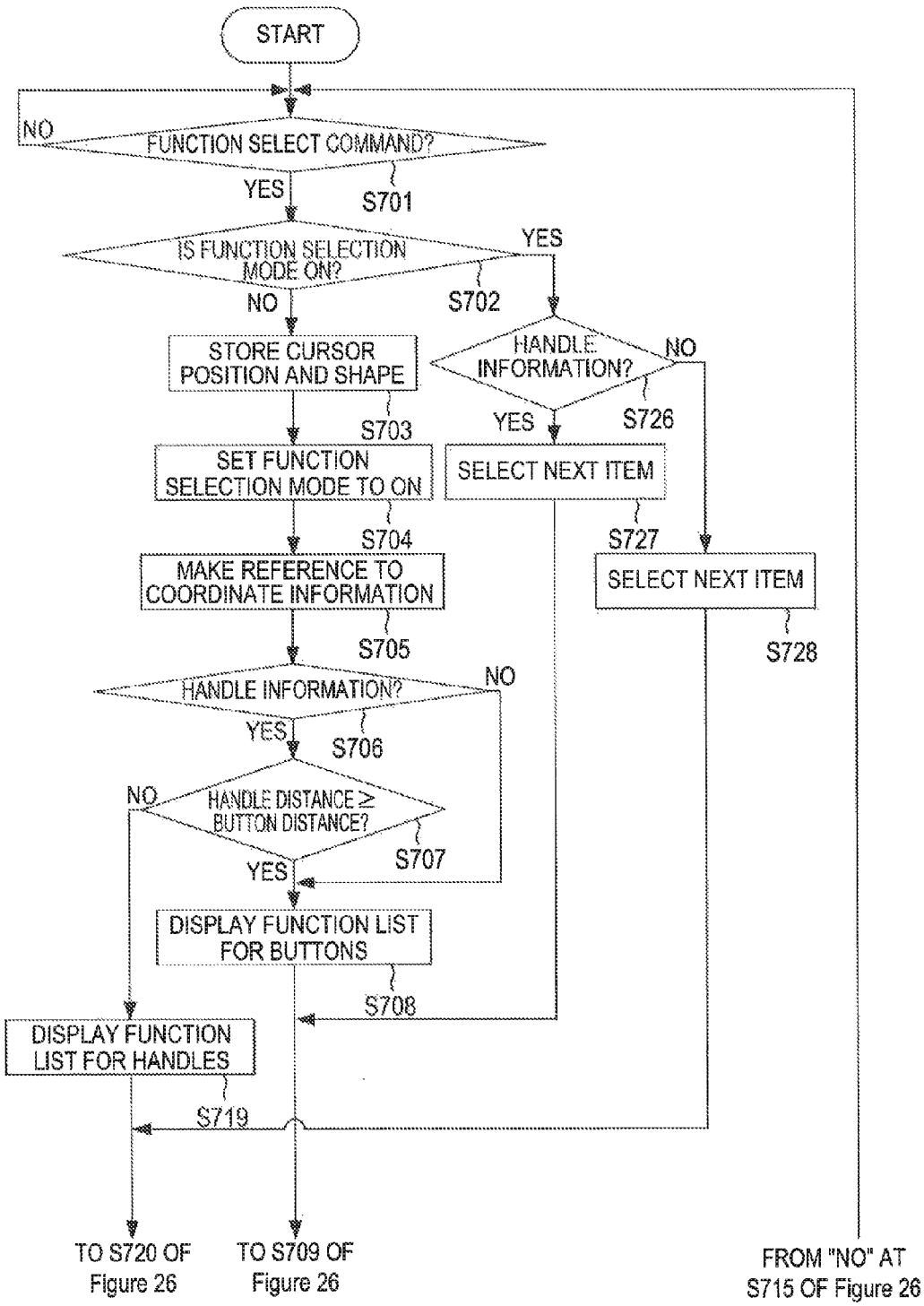
FIG. 25 is a flowchart illustrating the actions of a function selecting process according to a fourth embodiment of the invention.
Figure 26:
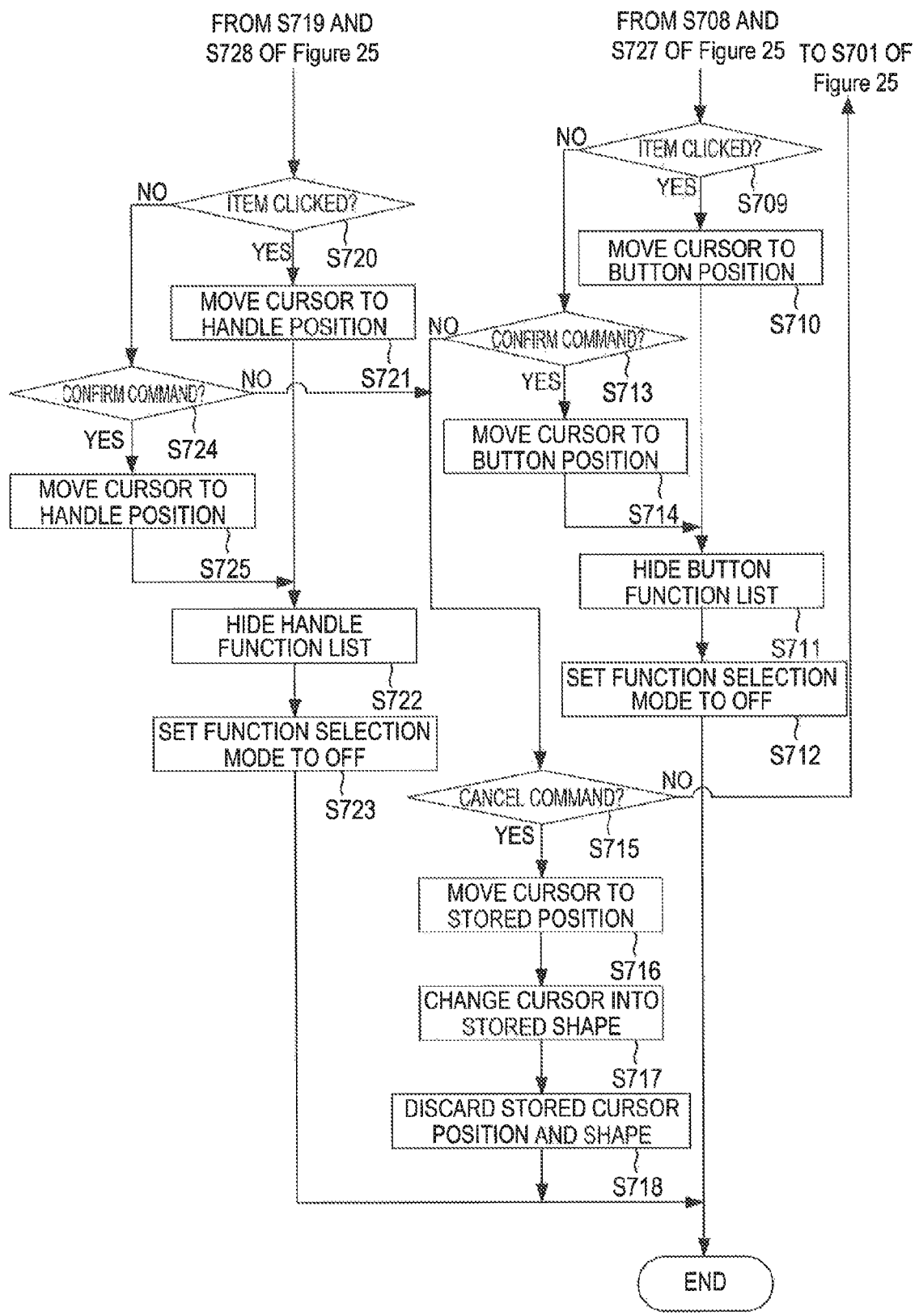
FIG. 26 is a flowchart illustrating the actions of a function selecting process according to the fourth embodiment.

While a fourth embodiment is similar to the third embodiment described above in that it displays a function list, it differs from the third embodiment in that it allows items of a function list to be selected with the cursor. The following description will describe operations of the information processing device according to the fourth embodiment that are different from the third embodiment. The information processing device of the fourth embodiment does not execute the function display process in the above-described manner and actions of its function display process are different from the other embodiments. FIGS. 25 and 26 are flowcharts illustrating the actions of function selecting process in the fourth embodiment.

As illustrated in FIG. 25, the command determination unit 307 first determines whether a function select command is given (step S701).

If a function select command is given (step S701: YES), function selection unit 308 determines whether the function selection mode is ON (step S702).

If the function selection mode is not ON (step S702: NO), the function selection unit 308 stores the position and shape of the cursor in an area of the memory 4 that is different from the area storing coordinate information (step S703). The function selection unit 308 then sets the function selection mode to ON (step S704), makes reference to coordinate information (step S705), and determines whether there is handle information (step S706).

If there is handle information (step S706: YES), the distance determination unit 306 determines whether the handle distance is equal to or greater than the button distance (step S707).

If the handle distance is equal to or greater than the button distance (step S707: YES), the function display unit 309 displays a function list for buttons (step S708), and determines whether any item of the function list is clicked (step S709).

If an item of the function list is clicked (step S709: YES), the function selection unit 308 moves the cursor to the button position that corresponds to the clicked item (step S710). The function display unit 309 then hides the button function list (step S711), and the function selection unit 308 sets the function selection mode to OFF (step S712), and ends the function selecting process.

If no item of the function list is clicked (step S709: NO), the command determination unit 307 determines whether a confirm command is given (step S713).

If a confirm command is given (step S713: YES), the function selection unit 308 moves the cursor to the button position that corresponds to the item selected and confirmed in the function list (step S714), and the function display unit 309 hides the button function list (step S711).

If a confirm command is not given (step S713: NO), the command determination unit 307 determines whether a cancel command is given (step S715).

If a cancel command is given (step S715: YES), the function selection unit 308 moves the cursor to the position that was stored in the memory 4 at step S703 (step S716), and changes the cursor shape into the shape stored in the memory 4 at step S703 (step S717). The function selection unit 308 then discards the position and shape of the cursor that were stored in the memory 4 at step S703 (step S718), and ends the function selecting process.

If a cancel command is not given (step S715: NO), the command determination unit 307 determines whether a function select command is given (step S701).

If the handle distance is smaller than the button distance in the determination at step S707 (step S707: NO), the function display unit 309 displays a function list for handles (step S719), and determines whether any item of the function list is clicked (step S720).

If an item of the function list is clicked (step S720: YES), the function selection unit 308 moves the cursor to the handle position that corresponds to the clicked item (step S721), and the function display unit 309 hides the handle function list (step S722). The function selection unit 308 then sets the function selection mode to OFF (step S723), and ends the function selecting process.

If no item of the function list is clicked (step S720: NO), the command determination unit 307 determines whether a confirm command is given (step S724).

If a confirm command is given (step S724: YES), the function selection unit 308 moves the cursor to the handle position that corresponds to the item selected and confirmed in the function list (step S725), and the function display unit 309 hides the button function list (step S722).

If a confirm command is not given (step S724: NO), the command determination unit 307 determines whether a cancel command is given (step S715).

As described above, due to movement of the cursor to a function handle position corresponding to an item clicked in the function list, the user can select a function more intuitively.

Fifth Embodiment

Figure 27:
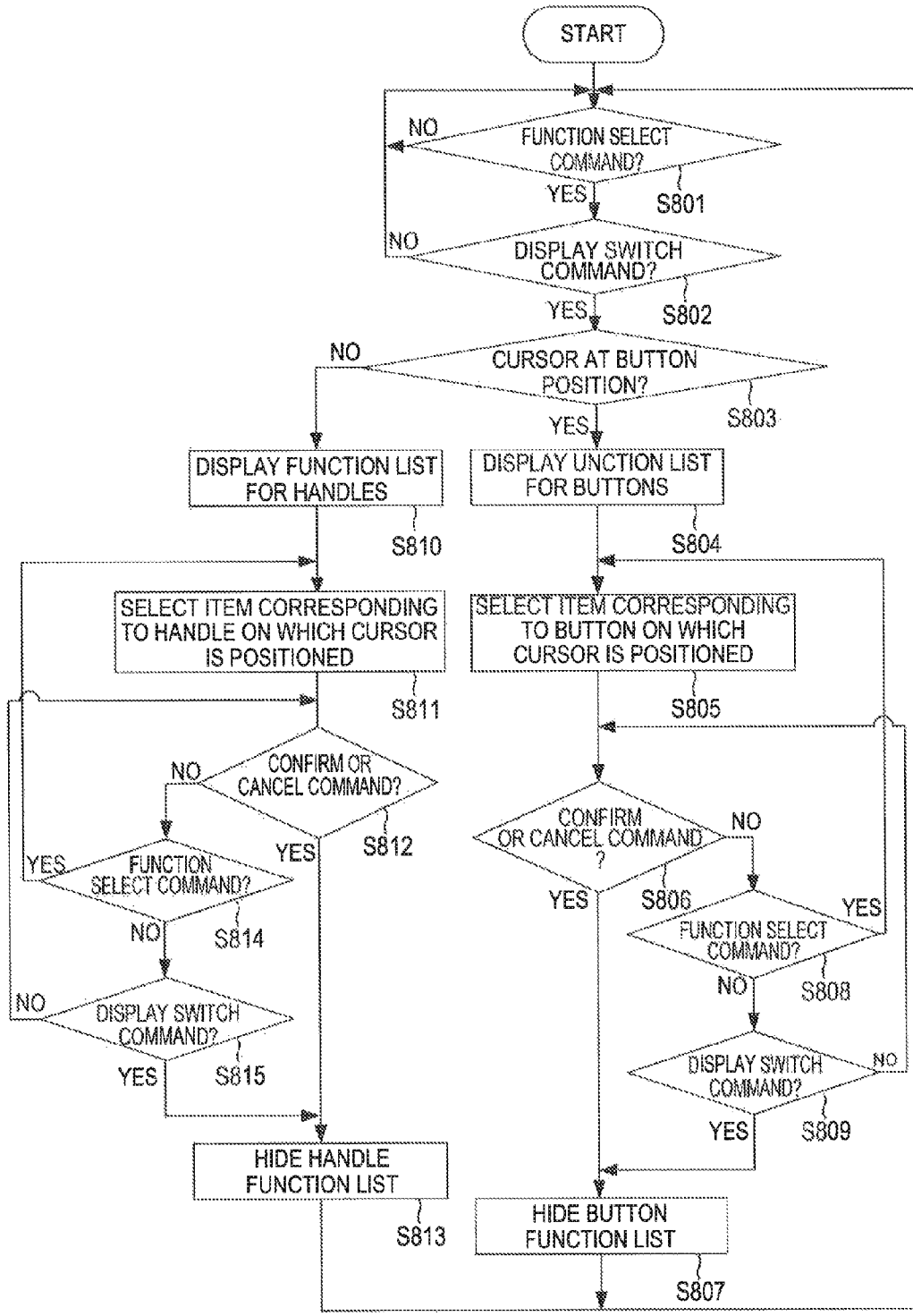
FIG. 27 is a flowchart illustrating the actions of a function display process according to a fifth embodiment of the invention.

A fifth embodiment is different from the third embodiment described above in that it allows the user to choose whether to display or hide function lists. The following description will illustrate the actions of function display process in the fifth embodiment that are different from the third embodiment. FIG. 27 is a flowchart illustrating the actions of function display process in the fifth embodiment. It is assumed that, in the fifth embodiment, display switch command for switching between display and non-display of function lists is assigned to a specific key of the keyboard.

As illustrated in FIG. 27, the command determination unit 307 first determines whether a function select command is given (step S801).

If a function select command is given (step S801: YES), the command determination unit 307 determines whether a display switch command is given (step S802).

If a display switch command is given (step S802: YES), the function display unit 309 determines whether the cursor is at a button position (step S803).

If the cursor is at a button position (step S803: YES), the function display unit 309 displays a function list for buttons (step S804), and selects an item that corresponds to the button on which the cursor is positioned in the function list (step S805). Then, the command determination unit 307 determines whether a confirm command or a cancel command is given (step S806).

If a confirm command or a cancel command is given (step S806: YES), the function display unit 309 hides the button function list (step S807), and the command determination unit 307 again determines whether a function select command is given (step S801).

If neither a confirm command nor a cancel command is given (step S806: NO), the command determination unit 307 determines whether a function select command is given (step S808).

If a function select command is not given (step S808: NO), the command determination unit 307 determines whether a display switch command is given (step S809).

If a display switch command is given (step S809: YES), the function display unit 309 hides the button function list (step S807), and the command determination unit 307 again determines whether a function select command is given (step S801).

If a display switch command is not given (step S809: NO), the command determination unit 307 again determines whether a confirm command or a cancel command is given (step S806).

If a function select command is given in the determination at step S808 (step S808: YES), an item corresponding to the button on which the cursor is positioned in the function list is selected (step S805).

When the cursor is not at a button position in the determination at step S803 (step S803: NO), the function display unit 309 displays a function list for handles (step S810), and selects an item corresponding to the handle on which the cursor is positioned in the function list (step S811). Then, the command determination unit 307 determines whether a confirm command or a cancel command is given (step S812).

If either a confirm command or a cancel command is given (step S812: YES), the function display unit 309 hides the handle function list being displayed (step S813), and the command determination unit 307 determines whether a function select command is given (step S801).

If neither a confirm command nor a cancel command is given (step S812: NO), the command determination unit 307 determines whether a function select command is given (step S814).

If a function select command is not given (step S814: NO), the command determination unit 307 determines whether a display switch command is given (step S815).

If a display switch command is given (step S815: YES), the function display unit 309 hides the handle function list being displayed (step S813).

If a display switch command is not given (step S815: NO), the command determination unit 307 determines whether a confirm command or a cancel command is given (step S812).

If a function select command is given in the determination at step S814 (step S814: YES), the function display unit 309 selects an item corresponding to the handle on which the cursor is positioned in the function list (step S811).

If a display switch command is not given in the determination at step S802 (step S802: NO), the command determination unit 307 again determines whether a function select command is given (step S801).

If a function select command is not given in the determination at step S801 (step S801: NO), the command determination unit 307 again determines whether a function select command is given (step S801).

As described above, since the user is allowed to switch between display/non-display of function lists, when a function list overlaps an area of the desktop the user wants to see, the user can temporarily hide the function list and check the area.

Figure 28:
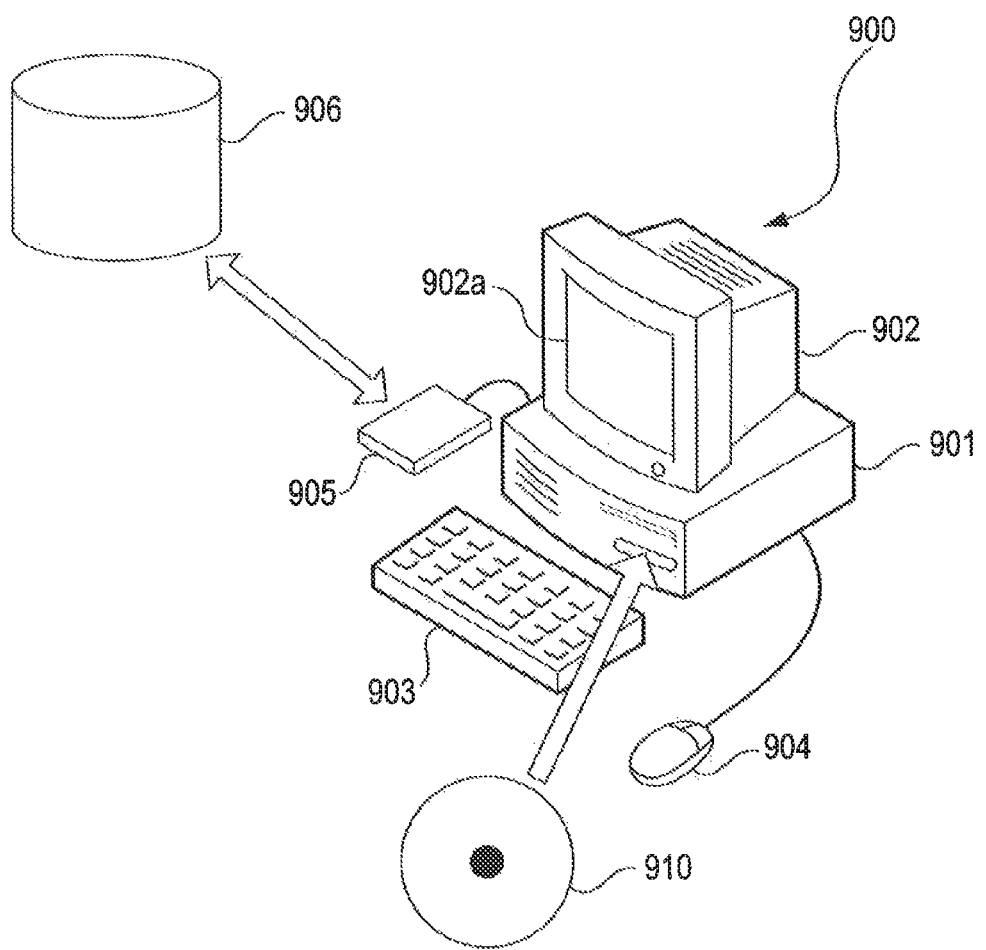
FIG. 28 illustrates an example of a computer system to which the disclosed techniques are applied.

The disclosed techniques are applicable to such a computer system as illustrated below. FIG. 28 illustrates an example of a computer system to which the disclosed techniques can be applied. A computer system 900 illustrated in the figure includes a main unit 901 that contains a CPU, disk drives and the like, a display 902 for displaying images as instructed by the main unit 901, a keyboard 903 for inputting various kinds of information to the computer system 900, a mouse 904 for specifying a certain position on a display screen 902a of the display 902, and a communication device 905 for accessing an external database or the like and downloading a program or the like stored in another computer system. The communication device 905 can be a network communication card, a modem, or the like.

A program for causing the above-described steps to be executed in such a computer system constituting an information processing device can be provided as an information processing program. The program can be executed by the computer system constituting the information processing device by being stored on a recording medium readable by the computer system. The program for executing each of the above-described steps may be stored on a removable recording medium such as a disk 910 or downloaded from a recording medium 906 of another computer system by the communication device 905. An information processing program that provides the computer system 900 with at least information processing functions is input into the computer system 900 and compiled. The program causes the computer system 900 to operate as the information processing device 1. The program may also be stored in a computer-readable recording medium, e.g., the disk 910. Recording media readable by the computer system 900 may include an internal storage device implemented inside a computer, such as ROM and RAM, a removable storage medium, such as the disk 910, flexible disk, DVD disk, magneto-optical disk, and IC card, a database maintaining computer programs, another computer system and its associated database, and various types of recording media that are accessible on a computer system connected by way of communication means, such as the communication device 905.

The present invention can be practiced in various other forms without departing from its spirit or key features. Therefore, the above-described embodiments are merely illustrative in all respects and are not to be construed in a limitative manner. The scope of the invention is defined by the Scope of Claims and is not limited by the description of the embodiments in any way. Furthermore, all variations, various improvements, alternatives, and reforms that fall within the equivalents of Scope of Claims are within the scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
    a display device;
    a pointing device;
    a cursor display unit that displays a cursor on a screen of the display device in accordance with operations of the pointing device;
    a first acquisition unit that acquires position information indicating a position, on the screen, of a function handle to which a function of processing a user interface object is assigned and which is displayed on the screen of the display device;
    a position changing unit that changes a display position of the cursor such that the cursor on the screen is at the position indicated by the position information acquired by the first acquisition unit, in response to commands inputted via a specific switch;
    a second acquisition unit that acquires the position on a screen of a cursor displayed by the cursor display unit; and
    a calculation unit that calculates a distance between the position of each of the plurality of function handles and the cursor,
    wherein the position changing unit changes the display position of the cursor such that the cursor indicates the position of a function handle with a smallest distance calculated by the calculation unit among the plurality of function handles,
    wherein the first acquisition unit acquires position information that indicates the respective positions of a plurality of function handles contained in an active area on the screen of the display device, and
    the position changing unit changes the display position of the cursor such that the cursor indicates the position of any one of the plurality of function handles in accordance with the position information,
    wherein after changing the position of the cursor, the position changing unit changes the display position of the cursor such that the cursor indicates a function handle different from the function handle indicated by the cursor in accordance with distances calculated by the calculation unit, in response to commands inputted via the switch.

2. The information processing device according to claim 1, further comprising a function display unit that displays, on the screen of the display device as a list, functions assigned to a plurality of function handles contained in the active area in response to commands inputted via the switch.

3. An information processing device comprising:
    a display device;
    a pointing device;
    a cursor display unit that displays a cursor on a screen of the display device in accordance with operations of the pointing device;
    a first acquisition unit that acquires position information indicating a position, on the screen, of a function handle to which a function of processing a user interface object is assigned and which is displayed on the screen of the display device;
    a position changing unit that changes a display position of the cursor such that the cursor on the screen is at the position indicated by the position information acquired by the first acquisition unit, in response to commands inputted via a specific switch; and
    a confirmation unit that, upon receiving a command to confirm a change from either the pointing device or the switch after changing the position of the cursor, confirms the change of the cursor position and keeps count of a number of confirmations for each of the plurality of function handles in response to a confirmation of a position change,
    wherein the position changing unit changes the display position of the cursor such that the cursor indicates the position of any one of the plurality of function handles, in accordance with the number of confirmations for each of the plurality of function handles,
    wherein the first acquisition unit acquires position information that indicates the respective positions of a plurality of function handles contained in an active area on the screen of the display device,
    the position changing unit changes the display position of the cursor such that the cursor indicates the position of any one of the plurality of function handles in accordance with the position information, and
    wherein after changing the position of the cursor, the position changing unit changes the display position of the cursor such that the cursor indicates a function handle different from the function handle indicated by the cursor in accordance with the number of confirmations for each of the plurality of function handles, in response to commands inputted via the switch.

4. The information processing device according to claim 3, further comprising a function display unit that displays, on the screen of the display device as a list, functions assigned to a plurality of function handles contained in the active area, in response to commands inputted via the switch.

5. A computer readable non-transitory recording medium storing an information processing program to make a computer which displays a cursor on a screen of a display device in accordance with operations of a pointing device execute:
    acquiring position information indicating a position, on the screen, of a function handle to which a function of processing a user interface object is assigned and which is displayed on the screen of the display device; and
    changing a display position of the cursor such that the cursor on the screen is at the position indicated by the position information acquired, in response to commands inputted via a specific switch,
    wherein the acquiring the position information includes acquiring position information that indicates the respective positions of a plurality of function handles contained in an active area on the screen of the display device; and
    the changing the display position includes changing the display position of the cursor such that the cursor indicates the position of any one of the plurality of function handles in accordance with the position information,
    wherein the program further makes the computer execute:
    acquiring the position on a screen of a cursor displayed by a cursor display unit; and
    calculating a distance between the position of each of the plurality of function handles and the cursor,
    wherein the changing the display position includes changing the display position of the cursor such that the cursor indicates the position of a function handle with a smallest distance calculated by a calculation unit among the plurality of function handles, and wherein after changing the position of the cursor, a position changing unit changes the display position of the cursor such that the cursor indicates a function handle different from the function handle indicated by the cursor in accordance with distances calculated by the calculation unit, in response to commands inputted via the switch.

6. A computer readable non-transitory recording medium storing an information processing program to make a computer which displays a cursor on a screen of a display device in accordance with operations of a pointing device execute:

acquiring position information indicating a position, on the screen, of a function handle to which a function of processing a user interface object is assigned and which is displayed on the screen of the display device; and changing a display position of the cursor such that the cursor on the screen is at the position indicated by the position information acquired, in response to commands inputted via a specific switch, wherein the acquiring the position information includes acquiring position information that indicates the respective positions of a plurality of function handles contained in an active area on the screen of the display device; and the changing the display position includes changing the display position of the cursor such that the cursor indicates the position of any one of the plurality of function handles in accordance with the position information, wherein the program further makes the computer execute:

upon receiving a command to confirm a change from either the pointing device or the switch after changing the position of the cursor, confirming the change of the cursor position and keeping count of a number of confirmations for each of the plurality of function handles in response to a confirmation of a position change, wherein the changing the display position includes changing the display position of the cursor such that the cursor indicates the position of any one of the plurality of function handles, in accordance with the number of confirmations for each of the plurality of function handles, and wherein after changing the position of the cursor, a position changing unit changes the display position of the cursor such that the cursor indicates a function handle different from the function handle indicated by the cursor in accordance with the number of confirmations for each of the plurality of function handles, in response to commands inputted via the switch.

7. An information processing method by which a computer executes:

displaying a cursor on a screen of a display device in accordance with operations of a pointing device;

acquiring position information indicating a position, on the screen, of a function handle to which a function of processing a user interface object is assigned and which is displayed on the screen of the display device; and changing a display position of the cursor such that the cursor on the screen is at the position indicated by the position information acquired, in response to commands inputted via a specific switch, wherein the acquiring the position information includes acquiring position information that indicates the respective positions of a plurality of function handles contained in an active area on the screen of the display device; and the changing the display position includes changing the display position of the cursor such that the cursor indicates the position of any one of the plurality of function handles in accordance with the position information, wherein the computer further executes:

acquiring the position on a screen of a cursor displayed by a cursor display unit; and calculating a distance between the position of each of the plurality of function handles and the cursor, wherein the changing the display position includes changing the display position of the cursor such that the cursor indicates the position of a function handle with a smallest distance calculated by the calculation unit among the plurality of function handles, and wherein after changing the position of the cursor, a position changing unit changes the display position of the cursor such that the cursor indicates a function handle different from the function handle indicated by the cursor in accordance with distances calculated by the calculation unit, in response to commands inputted via the switch.

8. An information processing method by which a computer executes:

displaying a cursor on a screen of a display device in accordance with operations of a pointing device;

acquiring position information indicating a position, on the screen, of a function handle to which a function of processing a user interface object is assigned and which is displayed on the screen of the display device; and changing a display position of the cursor such that the cursor on the screen is at the position indicated by the position information acquired, in response to commands inputted via a specific switch, wherein the acquiring the position information includes acquiring position information that indicates the respective positions of a plurality of function handles contained in an active area on the screen of the display device; and the changing the display position includes changing the display position of the cursor such that the cursor indicates the position of any one of the plurality of function handles in accordance with the position information, wherein the computer further executes:

upon receiving a command to confirm a change from either the pointing device or the switch after changing the position of the cursor, confirming the change of the cursor position and keeping count of a number of confirmations for each of the plurality of function handles in response to a confirmation of a position change, wherein the changing the display position includes changing the display position of the cursor such that the cursor indicates the position of any one of the plurality of function handles, in accordance with the number of confirmations for each of the plurality of function handles, and wherein after changing the position of the cursor, a position changing unit changes the display position of the cursor such that the cursor indicates a function handle different from the function handle indicated by the cursor in accordance with the number of confirmations for each of the plurality of function handles, in response to commands inputted via the switch.

* * * * *